(12) United States Patent
Asanuma et al.

(10) Patent No.: US 11,325,354 B2
(45) Date of Patent: May 10, 2022

(54) INTERLAYER FILM FOR LAMINATED GLASS

(71) Applicant: KURARAY CO., LTD., Kurashiki (JP)

(72) Inventors: Yoshiaki Asanuma, Kurashiki (JP); Takeshi Kusudou, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 896 days.

(21) Appl. No.: 16/089,055

(22) PCT Filed: Mar. 24, 2017

(86) PCT No.: PCT/JP2017/012118
§ 371 (c)(1),
(2) Date: Sep. 27, 2018

(87) PCT Pub. No.: WO2017/170259
PCT Pub. Date: Oct. 5, 2017

(65) Prior Publication Data
US 2020/0298535 A1    Sep. 24, 2020

(30) Foreign Application Priority Data

Mar. 28, 2016 (JP) .............................. JP2016-064367

(51) Int. Cl.
*B32B 17/10* (2006.01)
*B32B 27/30* (2006.01)
(Continued)

(52) U.S. Cl.
CPC .......... *B32B 17/10761* (2013.01); *B32B 7/02* (2013.01); *B32B 17/10036* (2013.01);
(Continued)

(58) Field of Classification Search
CPC ......... B32B 17/00–17/1099; B32B 7/00–7/14; C08L 29/00–29/14
See application file for complete search history.

(56) References Cited

U.S. PATENT DOCUMENTS

| | | | |
|---|---|---|---|
| 5,796,055 | A | 8/1998 | Benson, Jr. |
| 6,074,732 | A | 6/2000 | Garnier et al. |

(Continued)

FOREIGN PATENT DOCUMENTS

| | | |
|---|---|---|
| CN | 101448638 A | 6/2009 |
| CN | 104755969 A | 7/2015 |

(Continued)

OTHER PUBLICATIONS

"Monomers", TCI Chemicals, Retrieved Oct. 19, 2021.*
(Continued)

*Primary Examiner* — Prashant J Khatri
(74) *Attorney, Agent, or Firm* — Oblon, McClelland, Maier & Neustadt, L.L.P.

(57) ABSTRACT

Provided is an interlayer film for laminated glass which is excellent in sound insulation property and has improved sound insulation performance not only in a coincidence region but also in a mass-dominated region. The interlayer film for laminated glass includes a sound insulating layer which is formed from a composition (A) containing at least one resin (a1) selected from a thermoplastic resin and a thermosetting resin, wherein a tan δ obtained when a dynamic viscoelasticity of a sheet, which is obtained by molding the composition (A) to have a thickness of 0.8 mm, is measured at a frequency of 0.3 Hz in a tension mode has a maximal value at a temperature $T_A$ (° C.), $T_A$ (° C.) is in a range of −50 to 50° C., and the tan δ at $T_A$ (° C.) is 2.5 or more.

16 Claims, 1 Drawing Sheet

(51) Int. Cl.
*C08F 116/38* (2006.01)
*C08J 5/18* (2006.01)
*C08K 5/01* (2006.01)
*C08K 5/03* (2006.01)
*C08K 5/05* (2006.01)
*C08K 5/053* (2006.01)
*C08K 5/12* (2006.01)
*B32B 7/02* (2019.01)

(52) U.S. Cl.
CPC ........ *B32B 17/10743* (2013.01); *B32B 27/30* (2013.01); *B32B 27/308* (2013.01); *C08F 116/38* (2013.01); *C08J 5/18* (2013.01); *C08K 5/01* (2013.01); *C08K 5/03* (2013.01); *C08K 5/05* (2013.01); *C08K 5/053* (2013.01); *C08K 5/12* (2013.01); *B32B 2307/102* (2013.01); *B32B 2315/08* (2013.01); *B32B 2329/06* (2013.01); *B32B 2333/04* (2013.01); *B32B 2605/006* (2013.01); *B32B 2605/08* (2013.01); *C08J 2329/14* (2013.01); *C08J 2331/04* (2013.01)

(56) References Cited

U.S. PATENT DOCUMENTS

| 6,119,807 | A | 9/2000 | Benson, Jr. et al. |
|---|---|---|---|
| 2002/0068177 | A1 | 6/2002 | Garnier et al. |
| 2004/0225048 | A1* | 11/2004 | Miura ............... C08K 5/13 524/323 |
| 2005/0014007 | A1 | 1/2005 | Garnier et al. |
| 2009/0159362 | A1 | 6/2009 | Boure et al. |
| 2011/0070415 | A1* | 3/2011 | Nakamura ........... C08J 5/18 428/212 |
| 2011/0192678 | A1 | 8/2011 | Matsuda et al. |
| 2013/0157065 | A1 | 6/2013 | Shimamoto et al. |
| 2014/0327958 | A1 | 11/2014 | Yoshimura et al. |
| 2015/0146057 | A1 | 5/2015 | Konishi et al. |
| 2015/0239996 | A1* | 8/2015 | Funaya ............... C08F 10/00 526/127 |
| 2015/0258751 | A1 | 9/2015 | Shimamoto et al. |
| 2015/0323716 | A1 | 11/2015 | Greb et al. |
| 2016/0160024 | A1* | 6/2016 | Ma ............... B32B 27/00 524/503 |
| 2017/0028687 | A1* | 2/2017 | DeRosa ............... C08L 33/10 |
| 2017/0050415 | A1 | 2/2017 | Kanki et al. |
| 2018/0104931 | A1 | 4/2018 | Asanuma et al. |

FOREIGN PATENT DOCUMENTS

| CN | 104768894 A | 7/2015 |
|---|---|---|
| CN | 105082674 A | 11/2015 |
| EP | 0 494 663 A2 | 7/1992 |
| EP | 3 275 934 A1 | 1/2018 |
| JP | 5-229049 A | 9/1993 |
| JP | 5-294681 A | 11/1993 |
| JP | 2011-88785 A | 5/2011 |
| JP | 2013-67562 A | 4/2013 |
| TW | 201439160 A | 10/2014 |
| WO | WO 2010/038801 A1 | 4/2010 |
| WO | WO 2013/080987 A1 | 6/2013 |
| WO | WO 2014/156868 A1 | 10/2014 |
| WO | WO 2014/188544 A1 | 11/2014 |
| WO | WO 2015/122507 A1 | 8/2015 |
| WO | WO 2016/158882 A1 | 10/2016 |

OTHER PUBLICATIONS

Japanese Office Action dated Nov. 28, 2017 in Japanese Patent Apptication No. 2017-546751, citing documents AM and AN therein, 3 pages.

Handbook of Damping Technology, Corona Publishing Co., LTD., 2008, pp. 490-491, and 1258 with cover pages (with partial English translation).

Combined Chinese Office Action and Search Report dated Nov. 18, 2020 in Chinese Patent Application No. 201780021345.7 (with English translation of Categories of Cited Documents), citing documents AO-AU therein, 8 pages.

Extended European Search Report dated Dec. 6, 2019 in Patent Application No. 17774796.1, citing documents AA-AE, AO and AP therein, 9 pages.

* cited by examiner

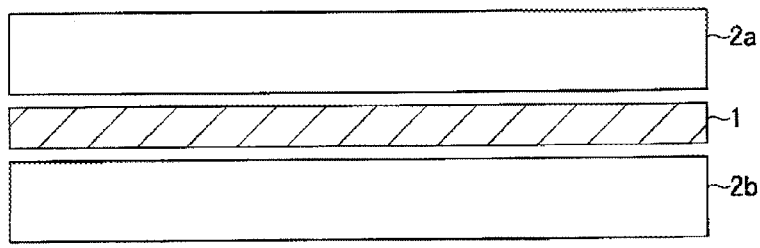

INTERLAYER FILM FOR LAMINATED GLASS

TECHNICAL FIELD

The present invention relates to an interlayer film for laminated glass.

BACKGROUND ART

A laminated glass obtained by sandwiching an interlayer film for laminated glass, which has high strength and high transparency and is excellent in adhesion to glass, and is excellent in flexibility, with two glass plates is used for a variety of safety glass such as automobile windshield.

In recent years, with an increasing demand for improvement in living environment quality, a need for sound insulation is increasing. Also in the laminated glass, a study on sound insulating laminated glass including an interlayer film for laminated glass having sound insulation property has been conducted (for example, Patent Literature 1). Conventionally known laminated glass using the interlayer film for laminated glass having sound insulation property has an effect of suppressing a decrease in sound transmission loss due to coincidence effect.

In recent years, a demand for decreasing automobile windshield in weight is increasing for the purpose of improving fuel efficiency of automobiles and lowering the center of gravity of automobiles. However, it is known that in the case of decreasing the windshield in weight, the sound transmission loss is decreased. According to Non Patent Literature 1, a sound transmission loss TL [dB] in the region subjected to the mass low is obtained, as a simplified manner, by Formula (1) when a surface density of laminated glass is designated as m [kg/m²] and a frequency is designated as f [Hz]:

[Mathematical Formula 1]

$$TL = 18 \log_{10}(m \times f) - 43.5 \quad (1)$$

and in a case where the surface density of laminated glass is decreased by 10% and 20%, it is found out that the sound transmission losses are decreased by about 0.8 dB and about 1.7 dB, respectively. That is, the decrease in weight and the sound insulation performance of the windshield has conventionally trade-off relation, and thus there are still problems in the balance between these characteristics.

CITATION LIST

Patent Literature

Patent Literature 1: WO 2014/188544 A

Non Patent Literature

Non Patent Literature 1: Handbook of Damping Technology (CORONA PUBLISHING CO., LTD., published in 2008), 490 pages, (3.60) Formula

SUMMARY OF INVENTION

Technical Problem

In order to achieve a balance between a decrease in weight and sound insulation performance of the windshield, it is necessary to improve sound insulation performance, particularly, to improve sound insulation performance in a mass-dominated region and to improve sound insulation performance in a coincidence region. In this regard, an object of the present invention is to provide an interlayer film for laminated glass which is excellent in sound insulation property and in which sound insulation performance in a mass-dominated region and sound insulation performance in a coincidence region can be improved.

Solution to Problem

According to the present invention, the above objects are achieved by providing the following:

[1] An interlayer film for laminated glass comprising a sound insulating layer which is formed from a composition (A) containing at least one resin (a1) selected from a thermoplastic resin and a thermosetting resin, wherein a tan δ obtained when a dynamic viscoelasticity of a sheet, which is obtained by molding the composition (A) to have a thickness of 0.8 mm, is measured at a frequency of 0.3 Hz in a tension mode has a maximal value at a temperature $T_A$ (° C.), $T_A$ (° C.) is in a range of −50 to 50° C., and the tan δ at $T_A$ (° C.) is 2.5 or more.

[2] The interlayer film for laminated glass according to [1], wherein the resin (a1) is a thermoplastic resin.

[3] The interlayer film for laminated glass according to [2], wherein the thermoplastic resin is any one of a polyvinyl acetal, a polyvinyl carboxylate, and an olefin-vinyl carboxylate copolymer.

[4] The interlayer film for laminated glass according to any one of [1] to [3], wherein a tan δ obtained when a dynamic viscoelasticity of a sheet, which is obtained by molding the resin (a1) to have a thickness of 0.8 mm, is measured at a frequency of 0.3 Hz in a tension mode has a maximal value at a temperature $T_B$ (° C.), and $T_B$ (° C.) is in a range of −100 to 100° C.

[5] The interlayer film for laminated glass according to any one of [1] to [4], wherein a hydroxyl value of the resin (a1) is 300 mgKOH/g or less.

[6] The interlayer film for laminated glass according to any one of [1] to [4], wherein a hydroxyl value of the resin (a1) is 20 mgKOH/g to 1000 mgKOH/g.

[7] The interlayer film for laminated glass according to any one of [1] to [6], wherein the composition (A) contains a compound (a2) having at least two ring structures.

[8] The interlayer film for laminated glass according to [7], wherein the compound (a2) is a compound having a condensed ring skeleton.

[9] The interlayer film for laminated glass according to [7] or [8], wherein the compound (a2) is a compound having at least one carbon atom bonded to four atoms which are all non-hydrogen atoms.

[10] The interlayer film for laminated glass according to [9], wherein the compound (a2) is a compound having a skeleton in which at least two ring structures are directly bonded to the carbon atom bonded to four atoms which are all non-hydrogen atoms.

[11] The interlayer film for laminated glass according to any one of [7] to [10], wherein the compound (a2) is a compound having a fluorene skeleton.

[12] The interlayer film for laminated glass according to any one of [7] to [11], wherein a hydroxyl value of the compound (a2) is 500 mgKOH/g or less.

[13] The interlayer film for laminated glass according to any one of [7] to [12], wherein a content of the compound (a2) is 5 to 1000 parts by mass with respect to 100 parts by mass of the resin (a1).

[14] The interlayer film for laminated glass according to any one of [7] to [13], wherein the composition (A) contains X parts by mass of the compound (a2) and Y parts by mass of a plasticizer (a3) different from the compound (a2) with respect to 100 parts by mass of the resin (a1), and in a case where X parts by mass of the compound (a2) and Y parts by mass of the plasticizer (a3) are stirred at 90° C. for 8 hours and then cooled to 23° C., the entire compound (a2) is dissolved in the plasticizer (a3).

[15] The interlayer film for laminated glass according to any one of [1] to [14], wherein a loss modulus E" obtained when a dynamic viscoelasticity of a sheet, which is obtained by molding the composition (A) to have a thickness of 0.8 mm, is measured at a frequency of 0.3 Hz in a tension mode has a maximal value at a temperature $T_C$ (° C.), $T_C$ (° C.) is in a range of ($T_A$−40) to $T_A$ (° C.), and the loss modulus E" at $T_C$ (° C.) is $2.5×10^7$ to $2.5×10^9$ Pa.

[16] The interlayer film for laminated glass according to any one of [1] to [15], wherein the sound insulating layer is disposed between two protecting layers, and the protecting layer is formed from a composition (B).

[17] The interlayer film for laminated glass according to [16], wherein a tan δ obtained when a dynamic viscoelasticity of a sheet, which is obtained by molding the composition (B) to have a thickness of 0.8 mm, is measured at a frequency of 0.3 Hz in a tension mode has a maximal value at a temperature $T_D$ (° C.), and $T_D−T_A>0$.

[18] The interlayer film for laminated glass according to [16] or [17], wherein the composition (B) contains at least one resin (b1) selected from a polyvinyl acetal, an ethylene-vinyl acetate copolymer, and an ionomer resin.

[19] The interlayer film for laminated glass according to [18], wherein the composition (B) contains the resin (b1) and a plasticizer (b2), and the resin (b1) is a polyvinyl acetal having an acetalization degree of 40 to 90 mol %.

[20] A laminated glass being obtained by sandwiching the interlayer film for laminated glass according to any one of [1] to [19] between two glass plates.

Advantageous Effects of Invention

The present invention can provide an interlayer film for laminated glass which is excellent in sound insulation property and has improved sound insulation performance not only in a coincidence region but also in a mass-dominated region.

BRIEF DESCRIPTION OF DRAWINGS

FIG. 1 is an exemplary cross-sectional view of a configuration of an interlayer film for laminated glass in which a sound insulating layer is disposed between two protecting layers.

DESCRIPTION OF EMBODIMENTS

An interlayer film for laminated glass of the present invention includes a sound insulating layer which is formed from a composition (A) containing at least one resin (a1) selected from a thermoplastic resin and a thermosetting resin, in which a tan δ obtained when a dynamic viscoelasticity of a sheet, which is obtained by molding the composition (A) to have a thickness of 0.8 mm, is measured at a frequency of 0.3 Hz in a tension mode has a maximal value at a temperature $T_A$ (° C.), the temperature $T_A$ (° C.) is in a range of −50 to 50° C., and the tan δ at $T_A$ (° C.) is 2.5 or more.

(Sound Insulating Layer)

The composition (A) constituting the sound insulating layer in the interlayer film for laminated glass of the present invention contains at least one resin (a1) selected from a thermoplastic resin and a thermosetting resin.

A hydroxyl value of the resin (a1) is preferably 300 mgKOH/g or less, more preferably 200 mgKOH/g or less, further preferably 100 mgKOH/g or less, even more preferably 80 mgKOH/g or less, even more preferably 60 mgKOH/g or less, particularly preferably 40 mgKOH/g or less, and most preferably 20 mgKOH/g or less, from the viewpoint of exhibiting excellent sound insulation performance, particularly from the viewpoint of improving compatibility to a compound (a2) to be described later.

Meanwhile, from the viewpoint of causing the sound insulating layer to exhibit sufficient mechanical strength, the hydroxyl value of the resin (a1) is preferably 20 mgKOH/g or more, more preferably 50 mgKOH/g or more, further preferably 100 mgKOH/g or more, particularly preferably 120 mgKOH/g or more, and most preferably 140 mgKOH/g or more. In addition, the hydroxyl value of the resin (a1) is preferably 1000 mgKOH/g or less, more preferably 800 mgKOH/g or less, particularly preferably 500 mgKOH/g or less, and most preferably 300 mgKOH/g or less.

An ester value of the resin (a1) is preferably 5 mgKOH/g or more, more preferably 50 mgKOH/g or more, further preferably 200 mgKOH/g or more, and particularly preferably 300 mgKOH/g or more. In addition, the ester value of the resin (a1) is preferably 800 mgKOH/g or less, more preferably 700 mgKOH/g or less, and further preferably 600 mgKOH/g or less. When the ester value satisfies the above range, excellent sound insulation performance is exhibited at an appropriate temperature particularly in the case of containing the compound (a2) to be described later, which is suitable.

Regarding the resin (a1), from the viewpoint that the interlayer film for laminated glass of the present invention exhibits excellent sound insulation performance at an appropriate temperature, it is preferable that a tan δ obtained when a dynamic viscoelasticity of a sheet, which is obtained by molding the resin (a1) to have a thickness of 0.8 mm, is measured at a frequency of 0.3 Hz in a tension mode has a maximal value at a temperature $T_B$ (° C.), and the temperature $T_B$ (° C.) is in a range of −100 to 100° C. $T_B$ (° C.) is more preferably −70° C. or higher, further preferably −50° C. or higher, particularly preferably −40° C. or higher, and most preferably −35° C. or higher. In addition, $T_B$ (° C.) is more preferably 75° C. or lower, further preferably 50° C. or lower, even more preferably 40° C. or lower, and most preferably 30° C. or lower. When $T_B$ does not satisfy the above range, it may be difficult to exhibit excellent sound insulation performance at an appropriate temperature.

A content of the resin (a1) in the composition (A) is preferably 20 mass % or more, more preferably 25 mass % or more, further preferably 30 mass % or more, and particularly preferably 35 mass % or more. The content of the resin (a1) in the composition (A) is preferably 100 mass % or less, more preferably 90 mass % or less, further preferably 80 mass % or less, and particularly preferably 75 mass % or less. When the content of the thermoplastic resin in the composition (A) is out of the above range, there is a tendency that sufficient sound insulation performance cannot be exhibited, or the strength of the sound insulating layer may not be sufficient.

From the viewpoint of exhibiting higher sound insulation performance, the resin (a1) is preferably a thermoplastic resin. Incidentally, the thermoplastic resin used in the present invention may partially contain a cross-linking structure or contain a small amount thereof in order to improve handleability and moldability within the range that the characteristics as the thermoplastic resin are not impaired.

As the thermoplastic resin, for example, a conventionally known thermoplastic resin such as a polyvinyl acetal, a polyvinyl alcohol, a polyurethane, a polyvinyl carboxylate, an olefin-vinyl carboxylate copolymer, a polyurethane elastomer, a polyester elastomer, a styrene-diene block copolymer, or chlorinated polyolefin can be used. Among these, from the viewpoint of exhibiting excellent sound insulation performance and having excellent weather resistance in the case of using the thermoplastic resin for long periods, a polyvinyl acetal is preferable. In addition, from the viewpoint of having excellent sound insulation performance, a polyvinyl carboxylate and an olefin-vinyl carboxylate copolymer are preferable.

A conventionally known polyvinyl acetal can be used as the polyvinyl acetal, and the polyvinyl acetal can be obtained, for example, by the following method. First, an aqueous solution of polyvinyl alcohol having a concentration of 3 to 30 mass % is maintained in a temperature range of 80 to 100° C., and then the temperature is gradually cooled over 10 to 60 minutes. When the temperature of the aqueous solution is lowered to −10 to 30° C., an aldehyde and an acid catalyst are added and the acetalization reaction is carried out while maintaining constant temperature for 30 to 300 minutes. Thereafter, the reaction liquid is increased to a temperature of 20 to 80° C. over 30 to 200 minutes, and the temperature is maintained for 30 to 300 minutes. Then, the reaction liquid is neutralized as necessary by adding a neutralizing agent such as an alkali, and the resin is washed with water and dried to obtain the polyvinyl acetal.

For example, either an organic acid or an inorganic acid can be used as the acid catalyst used for the acetalization reaction, and examples thereof include acetic acid, para-toluene sulfonic acid, nitric acid, sulfuric acid, and hydrochloric acid. Among these, hydrochloric acid, nitric acid, or sulfuric acid is preferably used.

For example, an aldehyde having 1 or more and 8 or less carbon atoms is preferably used as the aldehyde used for the acetalization reaction. Examples of the aldehyde having 1 or more and 8 or less carbon atoms include formaldehyde, acetaldehyde, propionaldehyde, n-butylaldehyde, isobutylaldehyde, n-pentylaldehyde, n-hexylaldehyde, 2-ethylbutylaldehyde, n-octylaldehyde, 2-ethylhexylaldehyde, and benzaldehyde, and these may be used alone or two or more kinds thereof may be used in combination. Among these, it is preferable to use an aldehyde having 2 to 5 carbon atoms, and it is more preferable to use an aldehyde having 4 carbon atoms. In particular, n-butylaldehyde is preferably used because of the following: it is easily available; the residual aldehyde after the acetalization reaction is easily removed by washing with water and drying; and a polyvinyl acetal to be obtained has an excellent balance between handleability and mechanical characteristics. Thus, as a polyvinyl acetal used in the present invention, polyvinyl butyral is particularly suitable.

An average amount of a residual hydroxyl group of the polyvinyl acetal is preferably 10 mol % or more, more preferably 12 mol % or more, further preferably 14 mol % or more, and particularly preferably 16 mol % or more. In addition, the average amount of the residual hydroxyl group of the polyvinyl acetal is preferably 60 mol % or less, more preferably 50 mol % or less, further preferably 35 mol % or less, particularly preferably 27 mol % or less, and most preferably 22 mol % or less. When the average amount of the residual hydroxyl group is less than 10 mol %, the mechanical strength of the composition (A) may not be sufficient, or compatibility with the compound (a2) having at least two ring structures to be described later may be degraded. Moreover, such a polyvinyl acetal may be difficult to inexpensively obtain. In addition, when the average amount of the residual hydroxyl group is more than 60 mol %, the composition (A) may be likely to absorb water or compatibility with the compound (a2) and a plasticizer (a3) which will be described later may be degraded. Moreover, sufficient sound insulation performance may not be exhibited. Incidentally, the average amount of the residual hydroxyl group of the polyvinyl acetal can be measured, for example, according to JIS K 6728: 1977.

The average amount of a residual vinyl ester group of the polyvinyl acetal is, from the viewpoint of sound insulation performance, preferably 0.1 mol % or more, more preferably 1 mol % or more, further preferably 3 mol % or more, and most preferably 5 mol % or more. In addition, from the viewpoint of mechanical strength and the viewpoint of weather resistance in the case of use for long periods, the average amount of the residual vinyl ester group of the polyvinyl acetal is preferably less than 50 mol %, more preferably 25 mol % or less, further preferably 20 mol % or less, particularly preferably 17 mol % or less, and most preferably 12 mol % or less. Incidentally, the average amount of the residual vinyl ester group of the polyvinyl acetal can be measured, for example, according to JIS K 6728: 1977.

An average acetalization degree of the polyvinyl acetal is preferably 40 mol % or more, more preferably 45 mol % or more, further preferably 50 mol % or more, particularly preferably 60 mol % or more, especially preferably 68 mol % or more, and most preferably 73 mol % or more. The average acetalization degree of the polyvinyl acetal is preferably 86 mol % or less, more preferably 84 mol % or less, and further preferably 82 mol % or less. When the average acetalization degree of the polyvinyl acetal is less than 40 mol %, in a case where the compound (a2) to be described later is used, compatibility with the compound (a2) may be degraded, and sufficient sound insulation performance may not be exhibited. When the average acetalization degree thereof is more than 86 mol %, industrially inexpensive production may be difficult, and the mechanical strength of the composition (A) to be obtained may be decreased. Incidentally, the average acetalization degree of the polyvinyl acetal can be measured, for example, according to JIS K 6728: 1977.

A polymerization degree of the polyvinyl acetal is preferably 150 or more, more preferably 1000 or more, and further preferably 1500 or more. The polymerization degree is preferably 4000 or less, more preferably 3000 or less, and further preferably 2500 or less. When the polymerization degree is less than 150, the mechanical strength of the composition (A) to be obtained may not be sufficient, and when the polymerization degree is more than 4000, processability during melt-processing may be degraded. Incidentally, the polymerization degree of the polyvinyl acetal is similar to a viscosity-average polymerization degree of the polyvinyl alcohol used as a raw material, and the viscosity-average polymerization degree of the polyvinyl alcohol can be measured, for example, according to JIS K 6724: 1994.

As the polyvinyl carboxylate used in the present invention, those obtained by polymerizing a vinyl carboxylate compound by employing a conventionally known method such as a solution polymerization method, a bulk polymerization method, a suspension polymerization method, or an emulsion polymerization method and appropriately selecting a polymerization initiator such as an azo-based initiator, a peroxide-based initiator, or a redox-based initiator depending on a polymerization method are exemplified. As the vinyl carboxylate compound, a vinyl carboxylate compound having 4 to 20 carbon atoms is preferable, a vinyl carboxylate compound having 4 to 10 carbon atoms is more preferable, and a vinyl carboxylate compound having 4 to 6 carbon atoms is further preferable. When the number of carbon atoms of the vinyl carboxylate compound is less than 4, it becomes difficult to produce a target polymer, and when the number of carbon atoms is more than 20, mechanical characteristics tend to be degraded or sound insulation performance tends to be degraded. Examples of such a vinyl carboxylate compound include vinyl acetate, n-propenyl acetate, isopropenyl acetate, n-butenyl acetate, isobutenyl acetate, vinyl propionate, vinyl butanoate, vinyl pentanoate, vinyl hexanoate, vinyl octanoate, vinyl decanoate, vinyl dodecanoate, and vinyl hexadecanoate. Among these, particularly, vinyl acetate, vinyl propionate, and vinyl butanoate are suitably used, and vinyl acetate is more suitably used.

As the polyvinyl carboxylate, those obtained by copolymerizing the vinyl carboxylate compound with monomers other than olefins can be used as long as they are not against the spirit of the present invention. Examples of the monomers include acrylic esters such as methyl acrylate, ethyl acrylate, n-butyl acrylate, i-butyl acrylate, t-butyl acrylate, 2-ethylhexyl acrylate, dodecyl acrylate, and octadecyl acrylate; methacrylate esters such as methyl methacrylate, ethyl methacrylate, n-butyl methacrylate, i-butyl methacrylate, t-butyl methacrylate, 2-ethylhexyl methacrylate, dodecyl methacrylate, and octadecyl methacrylate; acrylamides and derivatives thereof such as acrylamide, N-methylacrylamide, N-ethylacrylamide, N,N-dimethylacrylamide, diacetone acrylamide, acrylamide propane sulfonic acid and a salt thereof, acrylamide propyl dimethylamine, a salt thereof, and a quaternary salt thereof, and N-methylol acrylamide and a derivative thereof; methacrylamides and derivatives thereof such as methacrylamide, N-methylmethacrylamide, N-ethylmethacrylamide, methacrylamide propane sulfonic acid and a salt thereof, methacrylamide propyl dimethylamine, a salt thereof, and a quaternary salt thereof, and N-methylol methacrylamide and a derivative thereof; vinyl ethers such as methyl vinyl ether, ethyl vinyl ether, n-butyl vinyl ether, i-butyl vinyl ether, t-butyl vinyl ether, dodecyl vinyl ether, and stearyl vinyl ether; nitriles such as acrylonitrile and methacrylonitrile; vinyl halides such as vinyl chloride and vinyl fluoride; vinylidene halides such as vinylidene chloride and vinylidene fluoride; allyl compounds such as allyl acetate and allyl chloride; maleic acid ester or maleic anhydride; and vinylsilyl compounds such as vinyl trimetoxysilane. In a case where these other monomers are copolymerized, in general, other monomers are preferably used at a ratio of less than 10 mol % to the vinyl carboxylate compound.

The polymerization degree of the polyvinyl carboxylate is preferably 500 or more, more preferably 1000 or more, and further preferably 1500 or more. In addition, the polymerization degree of the polycarboxylic acid is preferably 10000 or less, more preferably 5000 or less, and further preferably 3500 or less. When the polymerization degree satisfies this range, excellent sound insulation performance and sufficient mechanical strength are exhibited, which is suitable.

As the olefin-vinyl carboxylate copolymer used in the present invention, for example, a conventionally known olefin-vinyl carboxylate copolymer is exemplified. As the olefins, for example, conventionally known compounds such as ethylene, propylene, n-butene, isobutyrene, butadiene, and isoprene can be used. In addition, examples of the vinyl carboxylate compound include vinyl acetate, n-propenyl acetate, isopropenyl acetate, n-butenyl acetate, isobutenyl acetate, vinyl propionate, vinyl butanoate, vinyl pentanoate, vinyl hexanoate, vinyl octanoate, vinyl decanoate, vinyl dodecanoate, and vinyl hexadecanoate. Among these, an ethylene-vinyl acetate copolymer using ethylene as an olefin and vinyl acetate as a vinyl carboxylate compound is preferable from the viewpoint of exhibiting excellent sound insulation performance and sufficient mechanical strength.

In the olefin-vinyl carboxylate copolymer, a ratio of the amount of vinyl carboxylate moieties to the total amount of olefin moieties and vinyl carboxylate moieties is preferably 10 mol % or more, more preferably 20 mol % or more, further preferably 30 mol % or more, and particularly 40 mol % or more. In addition, the ratio of the amount of vinyl carboxylate moieties to the total amount of olefin moieties and vinyl carboxylate moieties is preferably 90 mol % or less, more preferably 85 mol % or less, further preferably 80 mol % or less, and particularly preferably 75 mol % or less. When the amount of vinyl carboxylate moieties satisfies the above range, the interlayer film for laminated glass of the present invention can exhibit sufficient mechanical strength and excellent sound insulation performance at a suitable temperature.

Examples of the thermosetting resin contained in the composition (A) include an epoxy-based resin, a phenol-based resin, a urethane-based resin, a melamine resin, and an unsaturated polyester-based resin.

In the present invention, it is preferable that the sound insulating layer contains a compound (a2) having at least two ring structures since an interlayer film for laminated glass which is more excellent in sound insulation performance can be obtained. The number of members in the rings contained in the compound (a2) is preferably 3 to 10, more preferably 5 to 7, and further preferably 5 to 6. In addition, the compound having at least two ring structures includes a compound having a condensed-ring structure in which two or more rings are condensed (hereinafter, referred to as a condensed-ring compound in some cases) in addition to a compound having a plurality of monocyclic rings, and particularly, a condensed-ring compound is preferable from the viewpoint of exhibiting more excellent sound insulation performance in the interlayer film for laminated glass of the present invention.

In the compound (a2), from the viewpoint of improving the sound insulation property of the composition (A) to be obtained, it is preferable that at least one ring structure is preferably an aromatic ring and it is more preferable that at least two ring structures are an aromatic ring.

From the viewpoint of improving the sound insulation performance of the composition (A) to be obtained, the compound (a2) preferably has at least one carbon atom bonded to four atoms which are all non-hydrogen atoms, and it is more preferable that all of the four atoms which are all non-hydrogen atoms are a carbon atom. In addition, it is preferable that at least two ring structures are directly bonded to the carbon atom bonded to four atoms which are all non-hydrogen atoms, it is more preferable that at least three ring structures are directly bonded thereto, and it is further preferable that four ring structures are directly bonded thereto.

From the viewpoint of having excellent compatibility with the resin (a1) constituting the sound insulating layer and suppressing phase separation of the compound (a2) in the sound insulating layer in a case where the interlayer film for laminated glass is used for long periods and the viewpoint that a transparent layer is obtainable even in a case where the amount of the compound (a2) added to the sound insulating layer is increased, the compound (a2) is preferably a compound having one or more groups selected from an ether bond, an ester bond, and a hydroxyl group and more preferably a compound having two or more groups thereof in total.

The compound (a2) is preferably a compound consisting of only elements selected from a carbon atom, a hydrogen atom, and an oxygen atom from the viewpoint that the transparency of the interlayer film for laminated glass of the present invention is not impaired when used for long periods. In addition, it is suitable that the compound (a2) does not contain a phenolic hydroxyl group from the viewpoint that transparency is not impaired.

Examples of the compound (a2) include compounds having a fluorene skeleton such as 9,9-bis[4-(2-hydroxyphenyl]fluorene, 9,9-bis[4-(2-hydroxyethoxy)phenyl]fluorene, 9,9-bis[4-(2-(2-hydroxyethoxy)ethoxy)phenyl]fluorene, 9,9-bis[4-(2-acetoxyethoxy)phenyl]fluorene, 9,9-diphenylfluorene, 9,9-bis(4-bromophenyl)fluorene, and 9,9-bis(hydroxymethyl)fluorene; compounds having a tetraphenylmethane skeleton such as diphenylbis(4-hydroxyphenyl)methane, diphenylbis(4-(2-hydroxyethoxy)phenyl)methane, and tetraphenylmethane; and compounds having an acene-based skeleton (or an anthracene skeleton) such as 9-(hydroxymethyl)anthracene and 9-bromoanthracene. Among these, compounds having a fluorene skeleton are particularly preferable from the viewpoint of having excellent compatibility with the resin (a1) and a high effect of improving sound insulation performance of the interlayer film for laminated glass.

A molecular weight of the compound (a2) is preferably 150 or more, more preferably 250 or more, further preferably 300 or more, particularly preferably 350 or more, and most preferably 400 or more. In addition, the molecular weight of the compound (a2) is preferably 10000 or less, more preferably 2000 or less, further preferably 1200 or less, particularly preferably 1000 or less, and most preferably 800 or less. In a case where the molecular weight of the compound (a2) is less than 150, the compound (a2) tends to be volatilized when used for long periods, and in a case where the molecular weight of the compound (a2) is more than 10000, compatibility with the thermoplastic resin and the thermosetting resin tends to be degraded or sufficient sound insulation performance tends to be not exhibited.

A hydroxyl value of the compound (a2) is preferably 500 mgKOH/g or less, more preferably 300 mgKOH/g or less, further preferably 200 mgKOH/g or less, even more preferably 100 mgKOH/g or less, particularly preferably 50 mgKOH/g or less, and most preferably 20 mgKOH/g or less, from the viewpoint of improving compatibility with the resin (a1) and the viewpoint of maintaining the sound insulation performance of the interlayer film for laminated glass of the present invention even when used for long periods.

In addition, an ester value of the compound (a2) is preferably 300 mgKOH/g or less, more preferably 200 mgKOH/g or less, further preferably 100 mgKOH/g or less, particularly preferably 50 mgKOH/g or less, and most preferably 20 mgKOH/g or less, from the viewpoint of compatibility with the resin (a1) and maintaining the sound insulation performance of the interlayer film for laminated glass of the present invention even when used for long periods.

A melting point of the compound (a2) used in the present invention is 40° C. or higher and preferably 500° C. or lower. The melting point thereof is more preferably 60° C. or higher, further preferably 80° C. or higher, even more preferably 100° C. or higher, even more preferably 120° C. or higher, particularly preferably 140° C. or higher, especially preferably 150° C. or higher, and most preferably 160° C. or higher. In addition, the melting point thereof is more preferably 400° C. or lower, further preferably 300° C. or lower, particularly preferably 250° C. or lower, and most preferably 200° C. or lower. When the melting point is lower than 40° C., the interlayer film for laminated glass of the present invention may not exhibit sufficient sound insulation performance. In addition, when the melting point is higher than 500° C., it is difficult to homogeneously mix the compound having at least two ring structures and the resin, and in a case where the interlayer film for laminated glass of the present invention is used, transparency may be degraded.

A content of the compound (a2) is preferably 5 parts by mass or more, more preferably 10 parts by mass or more, further preferably 20 parts by mass or more, particularly preferably 35 parts by mass or more, especially preferably 55 parts by mass or more, particularly preferably 75 parts by mass or more, and most preferably 95 parts by mass or more, with respect to 100 parts by mass of the resin (a1). The content of the compound (a2) is preferably 1000 parts by mass or less, more preferably 300 parts by mass or less, further preferably 200 parts by mass or less, even more preferably 170 parts by mass or less, particularly preferably 150 parts by mass or less, and most preferably 130 parts by mass or less, with respect to 100 parts by mass of the resin (a1). In a case where the amount of the compound (a2) blended is less than 5 parts by mass, the value of tan cannot be sufficiently increased in some cases, and in a case where the content of the compound (a2) is more than 1000 parts by mass, the compound (a2) tends to bleed or phase separation tends to occur.

The composition (A) used in the present invention may contain a plasticizer (a3) that is a compound different from the compound (a2).

As the plasticizer (a3), compounds which has excellent compatibility with the thermoplastic resin and excellent plasticizing effect on the thermoplastic resin, for example, one or more compounds selected from compounds obtained by esterification reaction of one molecule of a j-valent carboxylic acid with j molecules of a monovalent alcohol (j=1 to 4) and compounds obtained by esterification reaction of k molecules of a monovalent carboxylic acid with one molecule of a k-valent alcohol (k=1 to 4) are suitably used.

Examples of the compounds obtained by esterification reaction of one molecule of a j-valent carboxylic acid with j molecules of a monovalent alcohol (j=1 to 4) include dihexyl adipate, di-2-ethylhexyl adipate, di(butoxyethyl) adipate, di(butoxyethoxyethyl)adipate, dinonyl adipate, butyl sebacate, hexyl sebacate, di(butoxyethyl) sebacate, cyclohexanedicarboxylic acid diisononylester, dioctyl phthalate, di-2-ethylhexyl phthalate, and tri-2-ethylhexyl trimellitate. In addition, examples of the compounds obtained by esterification reaction of k molecules of a monovalent carboxylic acid with one molecule of a k-valent alcohol (k=1 to 4) include triethylene glycol di-2-ethylbutanoate, triethylene glycol di-2-ethylhexanoate, triethylene glycol dinonate, tetraethylene glycol di-2-ethylbutyrate, tetraethylene glycol di-2-ethylhexanoate, glycerin tributyl, glycerin trihexyl, glycerin tri(butoxyethyl), and glycerin tri-2-ethylhexyl. Among these, triethylene glycol di-2-ethylhexanoate is particularly suitable from the viewpoint of being particularly excellent in compatibility with the thermoplastic resin and the plasticizing effect on the thermoplastic resin. These may be used alone or two or more kinds thereof may be used in combination.

In a case where the plasticizer (a3) is contained in the composition (A), the content of the plasticizer (a3) is preferably 10 parts by mass or more, more preferably 20 parts by mass or more, further preferably 25 parts by mass or more, and particularly preferably 30 parts by mass or more, with respect to 100 parts by mass of the thermoplastic resin. In addition, the content of the plasticizer (a3) is preferably 100 parts by mass or less, more preferably 70 parts by mass or less, further preferably 60 parts by mass or less, and particularly preferably 50 parts by mass or less, with respect to 100 parts by mass of the thermoplastic resin. When the content of the plasticizer (a3) is less than 10 parts by mass, the effect obtained by containing the plasticizer (a3) is not exhibited, and when the content of the plasticizer (a3) is more than 100 parts by mass, the compound (a2) and the plasticizer (a3) may bleed.

In a case where the compound (a2) and the plasticizer (a3) are contained in the composition (A), from the viewpoint of maintaining the tangent loss at the glass transition temperature to a high level while the glass transition temperature of the composition (A) to be obtained is lowered, the ratio of the content of the plasticizer (a3) to the content of the compound (a2) is preferably 0.03 mass times or more, more preferably 0.05 mass times or more, further preferably 0.08 mass times or more, particularly preferably 0.1 mass times or more, and most preferably 0.2 mass times or more. In addition, the ratio of the content of the plasticizer (a3) to the content of the compound (a2) is preferably 40 mass times or less, more preferably 20 mass times or less, further preferably 15 mass times or less, particularly preferably 10 mass times or less, and most preferably 5 mass times or less.

In a case where the composition (A) contains the compound (a2) and the plasticizer (a3), when the content of the compound (a2) is designated as X parts by mass and the content of the plasticizer (a3) is designated as Y parts by mass with respect to 100 parts by mass of the resin (a1), from the viewpoint that the interlayer film for laminated glass to be obtained can exhibit high transparency over long periods, it is preferable to satisfy the condition that the entire compound (a2) is dissolved in the plasticizer (a3) in a case where X parts by mass of the compound (a2) and Y parts by mass of the plasticizer (a3) are stirred at 90° C. for 8 hours and then cooled to 23° C. The absence or presence of the dissolving can be determined, for example, by a method described in Examples to be described later. Incidentally, X and Y are preferably in the ranges of the preferable content of the compound (a2) and the preferable content of the plasticizer (a3) described above, respectively.

The composition (A) may contain an adhesion improver (adhesion adjuster), an antioxidant, an ultraviolet absorber, and other additives, within the range that the effect of the present invention is not impaired.

Examples of the adhesion improver include alkali metal salts and alkali-earth metal salts such as sodium acetate, potassium acetate, magnesium acetate, and magnesium butyrate. The amount added can be appropriately adjusted according to a target adhesion force.

The tan δ obtained when the dynamic viscoelasticity of the sheet, which is obtained by molding the composition (A) to have a thickness of 0.8 mm, is measured at a frequency of 0.3 Hz in a tension mode has a maximal value at a temperature $T_A$ (° C.), $T_A$ (° C.) is in a range of −50 to 50° C., and the tan δ at $T_A$ (° C.) is 2.5 or more. The tan δ at $T_A$ (° C.) is more preferably 3.0 or more, further preferably 3.3 or more, particularly preferably 3.6 or more, and most preferably 4.0 or more, from the viewpoint of enhancing the sound insulation performance in the laminated glass used in the interlayer film for laminated glass of the present invention. Incidentally, the tan δ at $T_A$ (° C.) is typically 10 or less, 8.0 or less in some cases, and 6.0 or less in other cases. In addition, $T_A$ (° C.) is more preferably −30° C. or higher, further preferably −25° C. or higher, even more preferably −20° C. or higher, and particularly preferably −15° C. or higher. Moreover, $T_A$ (° C.) is more preferably 20° C. or lower, further preferably 15° C. or lower, even more preferably 10° C. or lower, particularly preferably 5° C. or lower, and most preferably 3° C. or lower. When $T_A$ is lower than −50° C., sound insulation performance may be exhibited only at a relatively lower temperature than room temperature, and when $T_A$ is higher than 50° C., sound insulation performance may be exhibited only at a relatively higher temperature than room temperature. As a method of obtaining the composition (A) in which the maximal value of the tan δ at $T_A$ (° C.) is 2.5 or more, for example, a method of causing the compound (a2), particularly, a compound having a fluorene skeleton to be contained in the composition (A) constituting the sound insulating layer is exemplified.

The $T_A$ and the tan δ can be measured, for example, by using the following method. The composition (A) is molded by a hot press machine to obtain a sheet having a thickness of 0.8 mm. The sheet is cut into a width of 3 mm, and analyzed using a dynamic viscoelasticity apparatus (manufactured by UBM Co., Ltd, Rheogel-E4000) at a distance between chucks of 20 mm, a frequency of 0.3 Hz, a displacement of 75.9 μm, and an automatic static load of 26 g in a tension mode while the temperature is increased from −50 to 120° C. at 3° C./min. The absence or presence of the temperature $T_A$ (° C.) at which the tangent loss (=loss modulus/storage elastic modulus) becomes maximal at a temperature in a range of −50 to 50° C. is checked, and the value of the tangent loss (tan δ) at $T_A$ (° C.) is obtained.

The composition (A) has advantages that by using the composition (A), which satisfies the condition that the tan δ at $T_A$ (° C.) obtained as described above (hereinafter, referred to as tan δ ($T_A$) in some cases) is 2.5 or more, in an interlayer film for laminated glass, it is possible to improve the sound insulation performance in the mass-dominated region and the sound insulation performance in the coincidence region, and to suppress degradation of the sound insulation performance in a case where the laminated glass is decreased in weight.

In addition, from the viewpoint of improving the sound insulation performance, a loss modulus E" obtained when the dynamic viscoelasticity of a sheet, which is obtained by molding the composition (A) to have a thickness of 0.8 mm, is measured at a frequency of 0.3 Hz in a tension mode has a maximal value at a temperature $T_C$ (° C.), and $T_C$ (° C.) is in a range of ($T_A$−40) to $T_A$ (° C.). The loss modulus E" at $T_C$ (° C.) is preferably $2.5 \times 10^7$ Pa or more and preferably $2.5 \times 10^9$ Pa or less. The loss modulus E" at $T_C$ (° C.) is more preferably $8.0 \times 10^7$ Pa or more and further preferably $2.5 \times 10^8$ Pa or more. In addition, the loss modulus E" at $T_C$ (° C.) is more preferably $2.3 \times 10^9$ Pa or less and further preferably $2.0 \times 10^9$ Pa or less. In order to set the loss modulus E" at $T_C$ (° C.) to $2.5 \times 10^7$ Pa or more and $2.5 \times 10^9$ Pa or less, for example, a method of causing the compound (a2), particularly, a compound having a fluorene skeleton to be contained in the composition (A) constituting the sound insulating layer is exemplified. Incidentally, the measurement conditions of the dynamic viscoelasticity are the same as the measurement conditions at the time of measuring the $T_A$ and the tan δ described above.

Further, in the composition (A) constituting the sound insulating layer in the present invention, a value obtained by dividing the loss modulus E" at $T_C$(° C.) (hereinafter, referred to as E" ($T_C$) in some cases) by E" at $T_C$−10 (° C.) (hereinafter, referred to as E" ($T_C$−10) in some cases), (E" ($T_C$)/E" ($T_C$−10)), is preferably 1.1 or more and preferably 10 or less. In a case where such a condition is satisfied, there is a tendency that the sound insulation performance is less likely to be degraded even in a case where the laminated glass is decreased in weight. The value obtained by dividing E" ($T_C$) by E" ($T_C$−10) is more preferably 1.2 or more. In addition, the value obtained by dividing E" ($T_C$) by E" ($T_C$−10) is more preferably 9 or less, further preferably 5 or less, and particularly preferably 2 or less.

(Protecting Layer)

The interlayer film for laminated glass of the present invention may be configured by only the sound insulating layer, but for example, can also employ a configuration in which the sound insulating layer is disposed between two protecting layers. When the interlayer film for laminated glass employs the configuration as described above, it is possible to obtain an interlayer film for laminated glass which is not only excellent in sound insulation property but also excellent in mechanical strength, adhesion to glass, and handleability.

The protecting layer is formed from a composition (B) containing a resin (b1). As the resin (b1) contained in the composition (B), a thermoplastic resin is preferable, and examples thereof include a polyvinyl acetal, an ethylene-vinyl acetate copolymer, and an ionomer. These are excellent in mechanical strength, transparency, and adhesion to glass, which is suitable.

The composition (B) contains preferably 40 mass % or more, more preferably 50 mass % or more, further preferably 60 mass % or more, particularly preferably 80 mass % or more, and most preferably 90 mass % or more of these resins (b1). In addition, the composition (B) may contain 100 mass % of these resins (b1). When the content of these resins (b1) is less than 40 mass %, adhesion between the protecting layer and glass may be degraded, and the mechanical strength of the protecting layer may not be sufficient.

The average amount of the residual hydroxyl group of the polyvinyl acetal is preferably 10 mol % or more, more preferably 15 mol % or more, further preferably 20 mol % or more, and particularly preferably 25 mol % or more. The average amount of the residual hydroxyl group of the polyvinyl acetal is preferably 50 mol % or less, more preferably 45 mol % or less, and further preferably 40 mol % or less. When the average amount of the residual hydroxyl group is less than 15 mol %, adhesion to glass tends to be degraded, and when the average amount of the residual hydroxyl group is more than 50 mol %, water resistance tends to be degraded.

The average amount of the residual vinyl ester group of the polyvinyl acetal is preferably 30 mol % or less. When the average amount of the residual vinyl ester group is more than 30 mol %, blocking is likely to occur at the time of production of the polyvinyl acetal, which becomes difficult to produce. The average amount of the residual vinyl ester group is preferably 20 mol % or less.

The average acetalization degree of the polyvinyl acetal is preferably 40 mol % or more and preferably 90 mol % or less. When the average acetalization degree is less than 40 mol %, compatibility with a plasticizer or the like tends to be degraded. When the average acetalization degree is more than 90 mol %, the reaction for obtaining a polyvinyl acetal resin may require a long time, which is sometimes not preferable in terms of the process, and sufficient mechanical strength may not be exhibited. The average acetalization degree is more preferably 60 mol % or more, and from the viewpoint of the water resistance and the compatibility with the plasticizer, is further preferably 65 mol % or more and particularly preferably 68 mol % or more. In addition, the average acetalization degree is preferably 85 mol % or less, further preferably 80 mol % or less, and particularly preferably 75 mol % or less.

The polymerization degree of the polyvinyl acetal is preferably 100 or more, more preferably 300 or more, more preferably 1000 or more, further preferably 1400 or more, and particularly preferably 1600 or more. When the polymerization degree of the polyvinyl acetal is less than 100, penetration resistance, creep resistant physical property, particularly, creep resistant physical property under high temperature and high humidity conditions such as 85° C. and 85% RH may be degraded. In addition, the polymerization degree of the polyvinyl acetal is preferably 5000 or less, more preferably 3000 or less, further preferably 2500 or less, particularly preferably 2300 or less, and most preferably 2000 or less. When the polymerization degree of the polyvinyl acetal is more than 5000, resin film formation may become difficult. Further, in order to improve lamination aptitude of the interlayer film for laminated glass to be obtained and obtain a laminated glass which is more excellent in appearance, the polymerization degree of the polyvinyl acetal is preferably 1800 or less.

Since the average amount of the residual vinyl ester group of the polyvinyl acetal is preferably set to 30 mol % or less, it is preferable to use a saponification product of a polyvinyl alcohol having a saponification degree of 70 mol % or more as a raw material. When the saponification degree of the polyvinyl alcohol is less than 70 mol %, transparency and heat resistance of the resin may be degraded, and reactivity with aldehydes may also be degraded. The saponification degree is more preferably 95 mol % or more.

The saponification degree of the saponification product of the polyvinyl alcohol can be measured, for example, according to JIS K 6726: 1944.

As aldehydes and polyvinyl acetal resins used for acetalization of the polyvinyl alcohol, any one of those in the above-described sound insulating layer can be employed.

Regarding an ethylene-vinyl acetate copolymer contained in the composition (B), the ratio of vinyl acetate moieties to the total amount of ethylene moieties and vinyl acetate moieties is preferably less than 50 mol %, more preferably less than 30 mol %, further preferably less than 20 mol %, and particularly preferably less than 15 mol % from the viewpoint that the mechanical strength and flexibility required for the interlayer film for laminated glass are exhibited.

As the ionomer contained in the composition (B), there is exemplified a resin having a structural unit derived from ethylene and a structural unit derived from α,β-unsaturated carboxylic acid, the α,β-unsaturated carboxylic acid being at least partially neutralized with a metal ion. In an ethylene-α,β-unsaturated carboxylic acid copolymer serving as a base polymer, the content ratio of the structural unit of the α,β-unsaturated carboxylic acid is preferably 2 mass % or more and more preferably 5 mass % or more. In addition, the content ratio of the structural unit of the α,β-unsaturated carboxylic acid is preferably 30 mass % or less and more preferably 20 mass % or less. In the present invention, from the viewpoint of ease of availability, an ionomer of ethylene-acrylic acid copolymer and an ionomer of ethylene-methacrylic acid copolymer are preferable. Examples of the α,β-unsaturated carboxylic acid constituting the ionomer include acrylic acid, methacrylic acid, maleic acid, monomethyl maleate, monoethyl maleate, and maleic anhydride, and acrylic acid or methacrylic acid is particularly preferable.

As components other than the resin (b1), a plasticizer (b2), an antioxidant, an ultraviolet absorber, a light stabilizer, a blocking preventing agent, a pigment, a dye, a functional inorganic compound, a heat shielding material (for example, inorganic heat shielding fine particles or an organic heat shielding material which have infrared absorbing capability), and the like may be further added to the composition (B) as necessary. In particular, in a case where the polyvinyl acetal is used in the composition (B), the composition (B) preferably contains the plasticizer (b2) from the viewpoint of the mechanical strength and the sound insulation property of the interlayer film for laminated glass to be obtained.

As the plasticizer (b2), for example, in addition to a carboxylic acid ester-based plasticizer such as a monovalent carboxylic acid ester-based plasticizer or a polyvalent carboxylic acid ester-based plasticizer; a phosphoric acid ester-based plasticizer, an organic phosphorous acid ester-based plasticizer, and the like, a polymer plasticizer such as a carboxylic acid polyester-based plasticizer, a polyester carbonate-based plasticizer, a polyalkylene glycol-based plasticizer, or an ester compound of hydroxycarboxylic acid and polyhydric alcohol such as castor oil can also be used. Among these, particularly, an ester compound of dihydric alcohol and monovalent carboxylic acid is preferable from the viewpoint that the interlayer film for laminated glass of the present invention exhibits excellent sound insulation performance, and triethylene glycol di-2-ethylhexanoate is particularly preferable.

Examples of the monovalent carboxylic acid ester-based plasticizer include compounds obtained by condensation reaction of a monovalent carboxylic acid such as butanoic acid, isobutanoic acid, pentanoic acid, hexanoic acid, 2-ethylhexanoic acid, heptanoic acid, octyl acid, 2-ethylhexanoic acid, or lauric acid and a polyhydric alcohol such as ethylene glycol, diethylene glycol, triethylene glycol, tetraethylene glycol, polyethylene glycol, or glycerin, and specific examples of the compounds include triethylene glycol di-2-ethylhexanoate, triethylene glycol diisobutanoate, triethylene glycol di-2-hexanoate, triethylene glycol di-2-ethylbutanoate, triethylene glycol dilaurate, ethylene glycol di-2-ethylhexanoate, diethylene glycol di-2-ethylhexanoate, tetraethylene glycol di-2-ethylhexanoate, tetraethylene glycol diheptanoate, PEG #400 di-2-ethylhexanoate, triethylene glycol mono-2-ethylhexanoate, and glycerin tri-2-ethylhexanoate. Herein, PEG #400 represents polyethylene glycol having an average molecular weight of 350 or more and 450 or less.

Examples of the polyvalent carboxylic acid ester-based plasticizer include compounds obtained by condensation reaction of a polyvalent carboxylic acid such as adipic acid, succinic acid, azelaic acid, sebacic acid, phthalic acid, isophthalic acid, terephthalic acid, or trimellitic acid and alcohol having 1 to 12 carbon atoms such as methanol, ethanol, butanol, hexanol, 2-ethyl butanol, heptanol, octanol, 2-ethyl hexanol, decanol, dodecanol, butoxy ethanol, butoxyethoxy ethanol, or benzyl alcohol. Specific examples of the compounds include dihexyl adipate, di-2-ethylhexyl adipate, diheptyl adipate, dioctyl adipate, di-2-ethylhexyl adipate, di(butoxyethyl)adipate, di(butoxyethoxyethyl)adipate, mono(2-ethylhexyl)adipate, dibutyl phthalate, dihexyl phthalate, di(2-ethylbutyl)phthalate, dioctyl phthalate, di(2-ethylhexyl)phthalate, benzylbutyl phthalate, and didodecyl phthalate.

Examples of the phosphoric acid-based plasticizer and the phosphorous acid-based plasticizer include compounds obtained by condensation reaction of phosphoric acid or phosphorous acid and an alcohol having 1 to 12 carbon atoms such as methanol, ethanol, butanol, hexanol, 2-ethyl butanol, heptanol, octanol, 2-ethyl hexanol, decanol, dodecanol, butoxy ethanol, butoxyethoxy ethanol, or benzyl alcohol. Specific examples of the compounds include trimethyl phosphate, triethyl phosphate, tripropyl phosphate, tributyl phosphate, tri(2-ethylhexyl)phosphate, tri(butoxyethyl)phosphate, and tri(2-ethylhexyl)phosphorus acid.

The carboxylic acid polyester-based plasticizer may be, for example, a carboxylic acid polyester obtained by alternating copolymerization of a polyvalent carboxylic acid such as oxalic acid, malonic acid, succinic acid, adipic acid, suberic acid, sebacic acid, dodecane diacid, 1,2-cyclohexane dicarboxylic acid, 1,3-cyclohexane dicarboxylic acid, or 1,4-cyclohexane dicarboxylic acid and a polyhydric alcohol such as ethylene glycol, diethylene glycol, triethylene glycol, tetraethylene glycol, 1,2-propylene glycol, 1,3-propylene glycol, 1,2-butylene glycol, 1,3-butylene glycol, 1,4-butylene glycol, 1,2-pentane diol, 1,5-pentane diol, 2,4-pentane diol, 1,2-hexane diol, 1,6-hexane diol, 3-methyl-1,5-pentane diol, 3-methyl-2,4-pentane diol, 1,2-heptane diol, 1,7-heptane diol, 1,2-octane diol, 1,8-octane diol, 1,2-nonane diol, 1,9-nonane diol, 2-methyl-1,8-octane diol, 1,2-decane diol, 1,10-decane diol, 1,2-dodecane diol, 1,12-dodecane diol, 1,2-cyclohexane diol, 1,3-cyclohexane diol, 1,4-cyclohexane diol, 1,2-bis(hydroxymethyl)cyclohexane, 1,3-bis(hydroxymethyl)cyclohexane, or 1,4-bis(hydroxymethyl)cyclohexane, or a carboxylic acid polyester obtained by ring opening polymerization of a lactone compound such as ε-caprolactone. The terminal structure of these carboxylic acid polyesters may be, for example, a hydroxyl group or a carboxyl group, and those obtained by reacting a terminal hydroxyl group or a terminal carboxyl group with a monovalent carboxylic acid or a monohydric alcohol to form an ester bond may be employed.

Examples of the polyester carbonate-based plasticizer include a carbonate polyester obtained by alternating copolymerization of a polyhydric alcohol such as ethylene glycol, diethylene glycol, triethylene glycol, tetraethylene glycol, 1,2-propylene glycol, 1,3-propylene glycol, 1,2-butylene glycol, 1,3-butylene glycol, 1,4-butylene glycol, 1,2-pentane diol, 1,5-pentane diol, 2,4-pentane diol, 1,2-hexane diol, 1,6-hexane diol, 3-methyl-1,5-pentane diol, 3-methyl-2,4-pentane diol, 1,2-heptane diol, 1,7-heptane diol, 1,2-octane diol, 1,8-octane diol, 1,2-nonane diol, 1,9-nonane diol, 2-methyl-1,8-octane diol, 1,2-decane diol, 1,10-decane diol, 1,2-dodecane diol, 1,12-dodecane diol, 1,2-cyclohexane diol, 1,3-cyclohexane diol, 1,4-cyclohexane diol, 1,2-bis(hydroxymethyl)cyclohexane, 1,3-bis(hydroxymethyl)cyclohexane, or 1,4-bis(hydroxymethyl)cyclohexane) and a carbonate ester such as dimethyl carbonate or diethyl carbonate through ester exchange reaction. The terminal structure of these carbonate polyester compound may be a carbonate ester group or a hydroxyl group.

Examples of the polyalkylene glycol-based plasticizer include a polymer obtained by ring opening polymerization of an alkylene oxide such as ethylene oxide, propylene oxide, or butylene oxide by using a monohydric alcohol, a polyhydric alcohol, a monovalent carboxylic acid, and a polyvalent carboxylic acid as an initiator.

In the present invention, these plasticizers (b2) may be used alone or two or more kinds thereof may be used in combination.

In a case where the composition (B) contains the plasticizer (b2), the content of the plasticizer (b2) is preferably 20 parts by mass or more, more preferably 25 parts by mass or more, and further preferably 30 parts by mass or more, with respect to 100 parts by mass of the resin (b1). The content of the plasticizer (b2) is preferably 60 parts by mass or less, more preferably 55 parts by mass or less, and further preferably 50 parts by mass or less, with respect to 100 parts by mass of the resin (b 1l). When the content of the plasticizer is less than 20 parts by mass with respect to 100 parts by mass of the resin (b1), the flexibility of the interlayer film for laminated glass to be obtained tends to be not sufficient so that shock absorption as the interlayer film for laminated glass may become a problem. In addition, when the content of the plasticizer (b2) is more than 60 parts by mass with respect to 100 parts by mass of the resin (b1), the mechanical strength of the interlayer film for laminated glass to be obtained tends to be not sufficient. In particular, in the case of using a polyvinyl acetal, from the viewpoint of exhibiting excellent sound insulation performance, the content of the plasticizer (b2) is suitably 35 to 60 parts by mass.

In a case where a temperature at which the tan δ obtained when a dynamic viscoelasticity of a sheet, which is obtained by molding the composition (B) constituting the protecting layer to have a thickness of 0.8 mm, is measured at a frequency of 0.3 Hz in a tension mode becomes maximal is designated as $T_D$ (° C.), it is satisfied that $T_D-T_A>0$, preferably $T_D-T_A>10$, and more preferably $T_D-T_A>20$. When such a condition is satisfied, it is possible to obtain an interlayer film for laminated glass which is excellent in mechanical strength, adhesion to glass, and handleability as well as excellent in sound insulation property.

(Interlayer Film for Laminated Glass)

A composition constituting the sound insulating layer or the protecting layer is obtained by mixing a resin and other components by a conventionally known method. As the mixing method, for example, a melt kneading using a mixing roll, a Plast mill, an extruder, or the like, a method of dissolving respective components in an appropriate organic solvent and then removing the solvent by distillation, or the like is exemplified.

The method for producing the interlayer film for laminated glass is not particularly limited. After the composition (B) constituting a protecting layer is uniformly kneaded, a protecting layer is produced by a known film formation method such as an extrusion method, a calender method, a pressing method, a casting method, or an inflation method, a sound insulating layer is produced by the same method, and these layers may be laminated by press molding, or the protecting layer, the sound insulating layer, and other necessary layers may be molded by a co-extrusion method. In addition, the produced sound insulating layer may be used alone.

Of known film formation methods, particularly, a method for producing an interlayer film for laminated glass using an extruder is suitably employed. The temperature of the resin at the time of extruding is preferably 150° C. or higher and more preferably 170° C. or higher. In addition, the temperature of the resin at the time of extruding is preferably 250° C. or lower and more preferably 230° C. or lower. When the temperature of the resin becomes too high, decomposition occurs in the resin to be used so that the resin may deteriorate. On the other hand, when the temperature is too low, discharging from the extruder is not stabilized so as to cause a mechanical trouble. In order to effectively remove volatile substances, it is preferable to remove the volatile substances from a vent port of the extruder by reducing pressure.

The interlayer film for laminated glass in the present embodiment may have a lamination constitution in which a sound insulating layer (hereinafter, also referred to as the layer A) 1 is sandwiched with a protecting layer (hereinafter, also referred to as the layer B) 2a and a protecting layer 2b, as illustrated in FIG. 1. The lamination constitution in the interlayer film for laminated glass is decided depending on the purposes, but other than the lamination constitution such as the layer B/the layer A/the layer B, lamination constitutions such as the layer B/the layer A/the layer B/the layer A and the layer B/the layer A/the layer B/the layer A/the layer B may be employed. Among these, in particular, from the viewpoint of having an excellent balance between handleability and sound insulation property, the layer B/the layer A/the layer B is preferable.

Further, one or more layers (referred to as the layer C) other than the layer A and the layer B may be included, and for example, lamination constitutions such as the layer B/the layer A/the layer C/the layer B, the layer B/the layer A/the layer B/the layer C, the layer B/the layer C/the layer A/the layer C/the layer B, the layer B/the layer C/the layer A/the layer B/the layer C, the layer B/the layer A/the layer C/the layer B/the layer C, the layer C/the layer B/the layer A/the layer B/the layer C, the layer C/the layer B/the layer A/the layer C/the layer B/the layer C, and the layer C/the layer B/the layer C/the layer A/the layer C/the layer B/the layer C may be employed. In addition, in the above-described lamination constitutions, components in the layer C may be the same or different. This also applies components in the layer A or the layer B, similarly.

Incidentally, a layer formed from a known resin can be used as the layer C, and for example, it is possible to use polyethylene, polypropylene, polyvinyl chloride, polystyrene, polyurethane, polytetrafluoroethylene, acrylic resin, polyamide, polyacetal, polycarbonate, polyester such as polyethylene terephthalate, polybutylene terephthalate, cyclic polyolefin, polyphenylene sulfide, polytetrafluoroethylene, polysulfone, polyether sulfone, polyarylate, liquid crystal polymer, polyimide, and the like. In addition, additives such as a plasticizer, an antioxidant, an ultraviolet absorber, a light stabilizer, a blocking preventing agent, a pigment, a dye, a heat shielding material (for example, inorganic heat shielding fine particles or an organic heat shielding material which have infrared absorbing capability), and a functional inorganic compound may also be added to the layer C as necessary.

Further, the interlayer film for laminated glass of the present invention preferably has an uneven structure formed on the surface by a conventionally known method such as meltfracture or embossing. Regarding the shape of the meltfracture or embossing, conventionally known shapes can be employed.

The thickness of the sound insulating layer in the present invention is preferably 0.005 mm or more, more preferably 0.01 mm or more, further preferably 0.02 mm or more, even more preferably 0.04 mm or more, even more preferably 0.07 mm or more, particularly preferably 0.1 mm or more, especially preferably 0.15 mm or more, and most preferably 0.2 mm or more. In addition, the thickness of the sound insulating layer is preferably 5 mm or less, more preferably 4 mm or less, further preferably 2 mm or less, even more preferably 1.6 mm or less, even more preferably 1.2 mm or less, particularly preferably 1.1 mm or less, especially preferably 1 mm or less, and most preferably 0.79 mm or less.

The thickness of the protecting layer in the present invention is preferably 0.01 mm or more, more preferably 0.1 mm or more, further preferably 0.15 mm or more, particularly preferably 0.20 mm or more, and most preferably 0.25 mm or more. In addition, the thickness of the protecting layer is preferably 1.00 mm or less, more preferably 0.70 mm or less, further preferably 0.60 mm or less, even more preferably 0.50 mm or less, particularly preferably 0.45 mm or less, and most preferably 0.4 mm or less.

The lower limit of the thickness of the interlayer film for laminated glass of the present invention is typically 0.1 mm, preferably 0.2 mm, more preferably 0.3 mm, further preferably 0.4 mm, particularly preferably 0.5 mm, even more preferably 0.6 mm, especially preferably 0.7 mm, and most preferably 0.75 mm. In addition, the upper limit thereof is 5 mm, preferably 4 mm, more preferably 2 mm, further preferably 1.6 mm, particularly preferably 1.2 mm, even more preferably 1.1 mm, especially preferably 1 mm, and most preferably 0.79 mm.

As glass to be laminated with the interlayer film for laminated glass of the present invention, for example, inorganic glass such as float plate glass, polished plate glass, template glass, wire-reinforced plate glass, or heat-absorbing plate glass, conventionally known organic glass such as polymethyl methacrylate or polycarbonate, and the like can be used without any limitation. These glasses may be colorless or colored. These glasses may be used alone or two or more kinds thereof may be used in combination. In addition, generally, the thickness of the glass is preferably 100 mm or less.

The shape of the surface of the interlayer film for laminated glass of the present invention preferably has a surface shape having an uneven structure formed thereon since it has excellent defoaming properties when the interlayer film for laminated glass is thermally pressure-bonded to the glass.

A laminated glass obtained by sandwiching the interlayer film for laminated glass of the present invention with two glass plates also constitutes the present invention. Such a laminated glass can be produced by a conventionally known method. For example, a method using a vacuum laminator, a method using a vacuum bag, a method using a vacuum ring, a method using a nip roll, and the like are exemplified. In addition, a method is also exemplified in which temporarily pressure bonding is performed by the above-described method, and then the obtained product is put into an autoclave and subjected to final pressure bonding.

It is preferable that the laminated glass is excellent in transparency, and for example, a haze thereof is preferably 3% or less, more preferably 1% or less, and further preferably 0.5% or less. Further, it is preferable that transparency of the laminated glass does not change over time in a case where the laminated glass is used for long periods, and for example, a haze immediately after preparation of the produced laminated glass was measured, and a haze after the laminated glass was stored at 23° C. and 50% RH for 25 weeks was measured. In a case where a value obtained by subtracting the haze immediately after preparation from the haze after 25 weeks is used as an index, the difference is preferably 50% or less, more preferably 1% or less, and further preferably 0.5% or less. When the difference is 50% or less, in a case where the laminated glass is used for long periods, for example, degradation of transparency possibly caused by precipitation of the compound having at least two ring structures additionally contained in the interlayer film for laminated glass of the present invention in the interlayer film for laminated glass is less likely to occur, which is suitable. Incidentally, in the present invention, the haze can be measured by a haze meter HZ-1 (manufactured by Suga Test Instruments Co., Ltd.) according to JIS K 7136: 2000.

EXAMPLES

[Evaluation Method]
(Evaluation of Resin by Dynamic Viscoelasticity)

Each of resins obtained in Production Examples to be described later and resins used in Examples to be described was pressed at 180° C. and 100 kg/cm² for 30 minutes using a hot press machine to obtain a sheet having a thickness of 0.8 mm. The obtained sheet was cut into a width of 3 mm to obtain a sample for dynamic viscoelasticity measurement. The sample for measurement was analyzed using a dynamic viscoelasticity apparatus (manufactured by UBM Co., Ltd, Rheogel-E4000) at a distance between chucks of 20 mm, a frequency of 0.3 Hz, a displacement of 75.9 μm, and an automatic static load of 26 g in a tension mode while the temperature was increased from −50 to 120° C. at 3° C./min. From the obtained result, a temperature Tr (° C.) at which a tangent loss tan δ (=loss modulus/storage elastic modulus) in a range of −50 to 120° C. becomes maximal was obtained. The results thereof are shown in Table 1.

(Evaluation of Composition by Dynamic Viscoelasticity)

A composition constituting the sound insulating layer used in each of Examples and Comparative Examples was pressed at 180° C. and 100 kg/cm² for 30 minutes using a hot press machine to obtain a sheet having a thickness of 0.8 mm. The sheet was cut into a width of 3 mm to obtain a sample for dynamic viscoelasticity measurement. The sample for measurement was analyzed using a dynamic viscoelasticity apparatus (manufactured by UBM Co., Ltd, Rheogel-E4000) at a distance between chucks of 20 mm, a frequency of 0.3 Hz, a displacement of 75.9 μm, and an automatic static load of 26 g in a tension mode while the temperature was increased from −50 to 120° C. at 3° C./min. From the obtained result, a temperature $T_A$ (° C.) at which a tangent loss tan δ (=loss modulus/storage elastic modulus) becomes maximal was obtained. The temperature $T_A$ and the tan δ (T) at the temperature $T_A$ are presented in Tables 3 to 6. Further, a loss modulus E" and a temperature $T_C$ (° C.) at which the loss modulus E" becomes maximal were obtained. Moreover, a loss modulus E" ($T_C$−10) at ($T_C$−10) (° C.) was obtained. Furthermore, a ratio of the loss modulus E" at the temperature $T_C$° C. to the loss modulus E" ($T_C$−10) at ($T_C$−10) was obtained. $T_C$, the loss modulus E" ($T_C$) at $T_C$, and the ratio of the loss modulus E" ($T_C$) to the loss modulus E" ($T_C$−10) are presented in Tables 3 to 6.

(Measurement of Temperature to at which Tan δ of Compound Constituting Protecting Layer Becomes Maximal)

A composition constituting the sound insulating layer used in each of Examples and Comparative Examples was melt-kneaded by Laboplast Mill (150° C., 60 rpm, 5 minutes), the obtained kneaded product was pressed at 150° C. and 100 kg/cm² for 30 minutes to obtain a sheet having a thickness of 0.8 mm, the sheet was cut into a width of 3 mm to evaluate a dynamic viscoelasticity, and then a temperature $T_D$ at which a tan δ becomes maximal was obtained. The measurement of the dynamic viscoelasticity was performed under the same condition as in the evaluation by the dynamic viscoelasticity of the sheet described above. The temperature $T_D$ (° C.) was 25° C.

(Sound Transmission Loss of Laminated Glass)

The laminated glass obtained in each of Examples and Comparative Examples was cut into a size of 25 mm×300 mm and vibrated by a vibrator (manufactured by EMIC corporation, Small Vibrator 512-A). A frequency response function at this time was detected using an FFT analyzer (manufactured by ONO SOKKI CO., LTD., DS-2100), and loss factors in the third order anti-resonant mode at respective temperatures of 0° C., 5° C., 10° C., 15° C., 20° C., 25° C., 30° C., 35° C., and 40° C. were obtained using servo analysis software (manufactured by ONO SOKKI CO., LTD., DS-0242). In addition, from the loss factors and values of the third order anti-resonant frequencies obtained in the above test, sound transmission losses at 2000 Hz, 2500 Hz, 3150 Hz, 4000 Hz, 5000 Hz, and 6300 Hz at temperatures of 0° C., 5° C., 10° C., 15° C., 20° C., 25° C., 30° C., 35° C., and 40° C. were calculated, and average values thereof were obtained. In Tables 3 to 6, the temperatures at which the average values of the sound transmission losses are the largest (in Tables 3 to 6, simply described as the "temperature"), the average values at the temperatures (in Tables 3 to 6, simply described as the "average value"), and the sound transmission loss values at 5000 Hz (in Tables 3 to 6, simply described as the "5000 Hz") are presented. It shows that the larger average values, the better sound transmission losses in wide frequencies including the so-called mass-dominated region, and that the excellent sound transmission losses at 5000 Hz mean excellent sound insulation performance at the coincidence region.

(Compatibility of Compound (a2) and Plasticizer (a3))

Regarding the composition (A) constituting the sound insulating layer used in each Example, in a case where the composition (A) contained 100 parts by mass of the resin (a1), X parts by mass of the compound (a2), and Y parts by mass of the plasticizer (a3), X parts by mass of the compound (a2) and Y parts by mass of the plasticizer (a3) used in each Example were weighed in an Erlenmeyer flask, treated at 90° C. for 8 hours while being stirred, and then cooled to 23° C., and it was checked whether or not the compound (a2) and the plasticizer (a3) are dissolved by visual inspection. Herein, the expression "the compound (a2) and the plasticizer (a3) are dissolved" indicates a case where the compound (a2) and/or the plasticizer (a3) are not precipitated, and the mixture does not cause phase separation and is not cloudy. The results thereof are shown in Table 3 and Table 4.

(Transparency of Laminated Glass)

A haze immediately after preparation of the produced laminated glass was measured, and a haze after the laminated glass was stored at 23° C. and 50% RH for 25 weeks after preparation was measured. A value obtained by subtracting the haze immediately after preparation from the haze after 25 weeks was obtained, a case in which the difference is 0.5% or less was designated as A, a case in which the difference is more than 0.5% and 1% or less was designated as B, a case in which the difference is more than 1% and 50% or less was designated as C, a case in which the difference is more than 50% and 70% or less was designated as D, and a case in which the difference is more than 70% was designated as E. In the case of having a smaller haze difference, that is, the cases of A, B, C, D, and E in this order, transparency is less likely to be degraded in a case where the interlayer film for laminated glass is used for long periods, which is preferable. The results thereof are shown in Table 3 and Table 4.

Thermoplastic resins were synthesized by the following methods of Production Example 1 to Production Example 3, respectively. Physical properties and the like of these thermoplastic resins, and ethylene-vinyl acetate copolymer-1, ethylene-vinyl acetate copolymer-2, ethylene-vinyl acetate copolymer-3, and polyvinyl acetate which will be described later are presented in Table 1.

Production Example 1

Into a 5 L glass vessel equipped with a reflux condenser, a thermometer, and an anchor type stirring wing, 4050 g of ion exchange water and 330 g of polyvinyl alcohol (PVA-1: viscosity-average polymerization degree: 1700, saponification degree: 92 mol %) were charged, and polyvinyl alcohol was completely dissolved by increasing the temperature to 95° C. The obtained solution was gradually cooled to 10° C. over about 30 minutes under stirring at 160 rpm, 197 g of butylaldehyde and 200 mL of aqueous solution of 20% hydrochloric acid were then added, and a butyralization reaction was carried out for 50 minutes. Thereafter, the temperature was increased to 65° C. over 60 minutes, maintained at 65° C. for 120 minutes, and then cooled to room temperature. The obtained resin was washed with ion exchange water, added with an aqueous solution of sodium hydroxide to neutralize the remaining acid, and further washed with an excess amount of ion exchange water and dried to obtain polyvinyl butyral (PVB-1). The obtained PVB-1 was analyzed according to JIS K 6728: 1977. As a result, the average butyralization degree (average acetalization degree) was 74.3 mol %, the content of the vinyl ester unit was 8.0 mol %, and the amount of the residual hydroxyl group was 17.7 mol % (see Table 1). In addition, hydroxyl value of PVB-1 was 162 mgKOH/g and the ester value thereof was 73 mgKOH/g.

Production Example 2

Into a 5 L glass vessel equipped with a reflux condenser, a thermometer, and an anchor type stirring wing, 4050 g of ion exchange water and 330 g of polyvinyl alcohol (PVA-1: viscosity-average polymerization degree: 1700, saponification degree: 99 mol %) were charged, and polyvinyl alcohol was completely dissolved by increasing the temperature to 95° C. The obtained solution was gradually cooled to 10° C. over about 30 minutes under stirring at 160 rpm, 188.5 g of butylaldehyde and 200 mL of aqueous solution of 20% hydrochloric acid were then added, and a butyralization reaction was carried out for 50 minutes. Thereafter, the temperature was increased to 65° C. over 60 minutes, maintained at 65° C. for 120 minutes, and then cooled to room temperature. The obtained resin was washed with ion exchange water, added with an aqueous solution of sodium hydroxide to neutralize the remaining acid, and further washed with an excess amount of ion exchange water and dried to obtain polyvinyl butyral (PVB-2). The obtained PVB-2 was analyzed according to JIS K 6728: 1977. As a result, the average butyralization degree (average acetalization degree) was 69.1 mol %, the content of the vinyl ester unit was 1.0 mol %, and the average amount of the residual hydroxyl group was 29.9 mol % (see Table 1). In addition, the hydroxyl value of PVB-2 was 264 mgKOH/g and the ester value thereof was 9 mgKOH/g.

Production Example 3

Into a 2 L glass vessel equipped with a reflux condenser, a thermometer, and an anchor type stirring wing, 100 g of polyvinyl alcohol (PVA-2: viscosity-average polymerization degree: 2400, saponification degree: 88 mol %), 270 g of anhydrous propionic acid, and 300 g of pyridine were added, and the mixture was maintained at 80° C. for 360 minutes under stirring. The reaction liquid was poured in water, and the obtained precipitate was fully washed with water, followed by drying. The obtained resin (PVOPr) was dissolved in deuterated chloroform and analyzed by $^1$H-NMR. As a result, the content of the vinyl acetate unit was 12 mol % and the content of the vinyl propionate unit was 88 mol %.

As a thermoplastic resin other than the thermoplastic resins in the above Production Examples, the following thermoplastic resins were used. The details of physical properties are presented in Table 1.

Ethylene-vinyl acetate copolymer-1: vinyl acetate content of 67 mol %

Ethylene-vinyl acetate copolymer-2: vinyl acetate content of 56 mol %

Ethylene-vinyl acetate copolymer-3: vinyl acetate content of 12 mol %

Polyvinyl acetate: vinyl acetate content of 100 mol % the resin presented in Table 1 and the compound (a2) presented in Table 2 were used and the composition and the thickness were changed as presented in Table 3 and Table 4. In addition, interlayer film for laminated glasses-2 to 17 and laminated glasses-2 to 17 were produced in the same manner

TABLE 1

| Resin (a1) | Polymerization degree | Average acetalization degree (mol %) | Content of vinyl ester unit (mol %) | Average amount of residual hydroxyl group (mol %) | Ethylene (mol %) | Hydroxyl value (mgKOH/g) | Ester value (mgKOH/g) | $T_B$ (° C.) |
|---|---|---|---|---|---|---|---|---|
| PVB-1 | 1700 | 74.3 | 8 | 17.7 | 0 | 162 | 73 | 70 |
| PVB-2 | 1700 | 69.1 | 1 | 29.9 | 0 | 264 | 9 | 72 |
| PVOPr | 2400 | 0 | 100 | 0 | 0 | 0 | 570 | 22 |
| Ethylene-vinyl acetate copolymer-1 | 1100 | 0 | 67 | 0 | 33 | 0 | 561 | 18 |
| Ethylene-vinyl acetate copolymer-2 | 1100 | 0 | 56 | 0 | 44 | 0 | 519 | 6 |
| Ethylene-vinyl acetate copolymer-3 | 1100 | 0 | 12 | 0 | 88 | 0 | 192 | −30 |
| Polyvinyl acetate | 2400 | 0 | 100 | 0 | 0 | 0 | 651 | 50 |

Example 1

100 parts by mass of ethylene-vinyl acetate copolymer-1, 100 parts by mass of fluorene compound-1 presented in Table 2 as the compound (a2), and 50 parts by mass of triethylene glycol di-2-ethylhexanoate as the plasticizer were melt-kneaded by Laboplast Mill (150° C., 60 rpm, 5 minutes) to obtain composition-1. The composition-1 was pressed at 150° C. and 100 kgf/cm² for 30 minutes to obtain sheet-1 having a thickness of 0.8 mm. Regarding the sheet-1, the temperature $T_A$, the tan δ ($T_A$), the temperature $T_C$, the loss modulus E" ($T_C$), and the loss modulus E" ($T_C$−10) were measured by the aforementioned methods to obtain the ratio of the loss modulus E" ($T_C$) to the loss modulus E" ($T_C$−10). The measurement results thereof are shown in Table 3.

The composition-1 was pressed at 150° C. and 100 kg/cm² for 30 minutes by a hot press to obtain sound insulating layer-1 having a thickness of 0.15 mm. In addition, 100 parts by mass of PVB-2 and 36 parts by mass of triethylene glycol di-2-ethylhexanoate were melt-kneaded by Laboplast Mill (150° C., 60 rpm, 5 minutes), and the obtained kneaded product was pressed at 150° C. and 100 kg/cm² for 30 minutes to obtain protecting layer-1 having a thickness of 0.33 mm. The obtained sound insulating layer-1 and protecting layer-1 were superimposed in the order of the protecting layer-1/the sound insulating layer-1/the protecting layer-1 and laminated by being pressed at 30° C. and 100 kg/c$^m$ for 10 minutes to obtain interlayer film for laminated glass-1.

Then, the interlayer film for laminated glass-1 was sandwiched with two sheets of float glass having a size of 300 mm×300 mm×2 mm, temporarily pressure-bonded in a vacuum bag, and then treated in an autoclave to obtain transparent laminated glass-1. Regarding the interlayer film for laminated glass-1, the sound transmission loss and the transparency were measured by the aforementioned methods. The measurement results thereof are shown in Table 3.

Examples 2 to 17

Sound insulating layers-2 to 17 and protecting layers were produced in the same manner as in Example 1, except that as in Example 1, except that the obtained sound insulating layers and protecting layers were used. Regarding the laminated glass obtained in each Example, the sound transmission loss and the transparency were measured by the aforementioned methods. The measurement results thereof are shown in Table 3 and Table 4. Further, sheets-2 to 17 having a thickness of 0.8 mm were obtained in the same manner as in Example 1, except that the composition was set to the same composition as that of the sound insulating layer of each Example. Regarding the obtained sheets, the temperature $T_A$, the tan δ ($T_A$), the temperature $T_C$, the loss modulus E" ($T_C$), and the loss modulus E" ($T_C$−10) were measured by the aforementioned methods to obtain the ratio of the loss modulus E" ($T_C$) to the loss modulus E" ($T_C$−10). The measurement results thereof are shown in Table 3 and Table 4.

Example 18

Interlayer film for laminated glass-18 and laminated glass-18 were produced in the same manner as in Example 1, except that a sound insulating layer-18 was produced in the same manner as in Example 1 except that the resin presented in Table 1 and the compound (a2) presented in Table 2 were used and the composition and the thickness were changed as presented in Table 4 and the sound insulating layer-18 was used as the interlayer film for laminated glass. Regarding the laminated glass obtained in each Example, the sound transmission loss and the transparency were measured by the aforementioned methods. The measurement results thereof are shown in Table 4. Further, sheet-18 having a thickness of 0.8 mm was obtained in the same manner as in Example 1, except that the composition was set to the same composition as that of the sound insulating layer of each Example. Regarding the obtained sheet, the temperature $T_A$, the tan δ ($T_A$), the temperature $T_C$, the loss modulus E" ($T_C$), and the loss modulus E" ($T_C$−10) were measured by the aforementioned methods to obtain the ratio of the loss modulus E" ($T_C$) to the loss modulus E" ($T_C$−10). The measurement results thereof are shown in Table 4.

TABLE 2

| Compound (a2) having at least two ring structures | Number of ring structures | Condensed ring | Hydroxyl value (mgKOH/g) | Ester value (mgKOH/g) | Number of carbon atoms bonded to four atoms which are all non-hydrogen atoms | Molecular weight | Ether bond (number) | Ester bond (number) | Hydroxyl group (number) | Melting point (° C.) |
|---|---|---|---|---|---|---|---|---|---|---|
| Fluorene compound-1 | 5 | Present | 0 | 215 | 1 | 522 | 2 | 2 | 0 | 48 |
| Fluorene compound-2 | 5 | Present | 256 | 0 | 1 | 438 | 2 | 0 | 2 | 161 |
| Fluorene compound-3 | 5 | Present | 0 | 0 | 1 | 318 | 0 | 0 | 0 | 226 |
| Fluorene compound-4 | 5 | Present | 320 | 0 | 1 | 350 | 0 | 0 | 2 | 223 |
| Fluorene compound-5 | 5 | Present | 0 | 0 | 1 | 478 | 0 | 0 | 0 | 138 |
| Fluorene compound-6 | 3 | Present | 496 | 0 | 1 | 296 | 0 | 0 | 2 | 142 |
| Diphenylbis(4-hydroxyphenyl)methane | 4 | Absent | 318 | 0 | 1 | 352 | 0 | 0 | 2 | >300 |
| 9-Hydroxymethyl anthracene | 3 | Present | 250 | 0 | 0 | 224 | 0 | 0 | 1 | 160 |

Fluorene compound-1: 9,9-bis[4-(2-acetoxyethoxy)phenyl]fluorene

Fluorene compound-2: 9,9-bis[4-(2-hydroxyethoxy)phenyl]fluorene

Fluorene compound-3: 9,9-diphenylfluorene

Fluorene compound-4: 9,9-bis(4-hydroxyphenyl)fluorene

Fluorene compound-5: 9,9-bis(4-bromophenyl)fluorene

Fluorene compound-6: 9,9-dimethanol fluorene

TABLE 3

|  |  | Resin | Compound (a2) Type | Compound (a2) Content*2 (parts by mass) | Plasticizer (a3) Type | Plasticizer (a3) Content*2 (parts by mass) | Thickness (mm) | $T_A$ (° C.) | tan δ ($T_A$) |
|---|---|---|---|---|---|---|---|---|---|
| Ex. 1 | Sound insulating layer | Ethylene-vinyl actate copolymer-1 | Fluorene compound-1 | 100 | 3G8*1 | 50 | 0.15 | −5.7 | 3.7 |
|  | Protecting layer | PVB-2 | — | — | 3G8*1 | 36 | 0.33 |  |  |
| Ex. 2 | Sound insulating layer | Ethylene-vinyl actate copolymer-2 | Fluorene compound-1 | 100 | 3G8*1 | 50 | 0.15 | −10.3 | 3.4 |
|  | Protecting layer | PVB-2 | — | — | 3G8*1 | 36 | 0.33 |  |  |
| Ex. 3 | Sound insulating layer | Ethylene-vinyl actate copolymer-3 | Fluorene compound-1 | 100 | 3G8*1 | 50 | 0.15 | −21.2 | 2.9 |
|  | Protecting layer | PVB-2 | — | — | 3G8*1 | 36 | 0.33 |  |  |
| Ex. 4 | Sound insulating layer | Ethylene-vinyl actate copolymer-1 | Fluorene compound-2 | 100 | 3G8*1 | 60 | 0.15 | −2.5 | 4 |
|  | Protecting layer | PVB-2 | — | — | 3G8*1 | 36 | 0.33 |  |  |
| Ex. 5 | Sound insulating layer | PVB-1 | Fluorene compound-2 | 150 | 3G8*1 | 60 | 0.15 | 18.1 | 4.5 |
|  | Protecting layer | PVB-2 | — | — | 3G8*1 | 36 | 0.33 |  |  |
| Ex. 6 | Sound insulating layer | PVB-1 | Fluorene compound-2 | 100 | 3G8*1 | 60 | 0.15 | 12.1 | 3.5 |
|  | Protecting layer | PVB-2 | — | — | 3G8*1 | 36 | 0.33 |  |  |
| Ex. 7 | Sound insulating layer | PVB-1 | Fluorene compound-2 | 100 | 3G8*1 | 75 | 0.15 | 5.8 | 3.2 |
|  | Protecting layer | PVB-2 | — | — | 3G8*1 | 36 | 0.33 |  |  |
| Ex. 8 | Sound insulating layer | PVB-1 | Fluorene compound-2 | 75 | 3G8*1 | 75 | 0.15 | −3.2 | 2.9 |
|  | Protecting layer | PVB-2 | — | — | 3G8*1 | 36 | 0.33 |  |  |

TABLE 3-continued

| | | $T_C$ (° C.) | E" ($T_C$) (Pa) | E" ($T_C$)/E" ($T_C$ [31 [0 10]) | Sound transmission loss Temperature (° C.) | Sound transmission loss Average value [dB] | Sound transmission loss 5000 Hz [dB] | Solubility of compound having at least two ring structures and plasticizer | Transparency |
|---|---|---|---|---|---|---|---|---|---|
| Ex. 1 | Sound insulating layer Protecting layer | −22.3 | $2.68 \times 10^8$ | 1.26 | 20 | 42.3 | 42.6 | Solved | A |
| Ex. 2 | Sound insulating layer Protecting layer | −31 | $2.46 \times 10^8$ | 1.24 | 15 | 42 | 42 | Solved | A |
| Ex. 3 | Sound insulating layer Protecting layer | −39.6 | $2.23 \times 10^8$ | 1.21 | 5 | 41.3 | 41.5 | Solved | A |
| Ex. 4 | Sound insulating layer Protecting layer | −21.4 | $2.84 \times 10^8$ | 1.25 | 20 | 42.4 | 42.8 | Not Solved | C |
| Ex. 5 | Sound insulating layer Protecting layer | −1.2 | $2.71 \times 10^8$ | 1.23 | 40 | 42.5 | 43.1 | Not Solved | C |
| Ex. 6 | Sound insulating layer Protecting layer | −8.9 | $2.62 \times 10^8$ | 1.33 | 35 | 42 | 42.1 | Not Solved | C |
| Ex. 7 | Sound insulating layer Protecting layer | −16.5 | $2.43 \times 10^8$ | 1.22 | 30 | 41.6 | 42 | Not Solved | C |
| Ex. 8 | Sound insulating layer Protecting layer | −25.6 | $2.24 \times 10^8$ | 1.16 | 20 | 41.4 | 41.2 | Not Solved | C |

*[1]3G8 (trietylene glycol di-2-ethylhexanoate)
*[2]content with respect to 100 parts by mass of resin

TABLE 4

| | | Resin | Compound (a2) Type | Compound (a2) Content*[2] (parts by mass) | Plasticizer (a3) Type | Plasticizer (a3) Content*[2] (parts by mass) | Thickness (mm) | $T_A$ (° C.) | tan δ ($T_A$) |
|---|---|---|---|---|---|---|---|---|---|
| Ex. 9 | Sound insulating layer | PVB-1 | Fluorene compound-3 | 70 | 3G8*[1] | 60 | 0.15 | 4.3 | 2.8 |
| | Protecting layer | PVB-2 | — | — | 3G8*[1] | 36 | 0.33 | | |
| Ex. 10 | Sound insulating layer | PVB-1 | Fluorene compound-4 | 70 | 3G8*[1] | 60 | 0.15 | 0.4 | 3 |
| | Protecting layer | PVB-2 | — | — | 3G8*[1] | 36 | 0.33 | | |
| Ex. 11 | Sound insulating layer | PVB-1 | Fluorene compound-5 | 70 | 3G8*[1] | 60 | 0.15 | 2.3 | 3.1 |
| | Protecting layer | PVB-2 | — | — | 3G8*[1] | 36 | 0.33 | | |
| Ex. 12 | Sound insulating layer | PVB-1 | Fluorene compound-6 | 70 | 3G8*[1] | 60 | 0.15 | 1.7 | 3 |
| | Protecting layer | PVB-2 | — | — | 3G8*[1] | 36 | 0.33 | | |
| Ex. 13 | Sound insulating layer | PVOPr | Fluorene compound-1 | 100 | 3G8*[1] | 60 | 0.15 | 3.2 | 3.5 |
| | Protecting layer | PVB-2 | — | — | 3G8*[1] | 36 | 0.33 | | |
| Ex. 14 | Sound insulating layer | Polyvinyl acetate | Fluorene compound-1 | 100 | 3G8*[1] | 60 | 0.15 | 2.4 | 3.4 |
| | Protecting layer | PVB-2 | — | — | 3G8*[1] | 36 | 0.33 | | |
| Ex. 15 | Sound insulating layer | Polyvinyl acetate | Fluorene compound-2 | 150 | 3G8*[1] | 60 | 0.15 | 17.8 | 6 |
| | Protecting layer | PVB-2 | — | — | 3G8*[1] | 36 | 0.33 | | |
| Ex. 16 | Sound insulating layer | PVB-1 | Diphenylbis(4-hydroxyphenyl)methane | 70 | 3G8*[1] | 60 | 0.15 | 3.4 | 3.2 |
| | Protecting layer | PVB-2 | — | — | 3G8*[1] | 36 | 0.33 | | |
| Ex. 17 | Sound insulating layer | PVB-1 | 9-hydroxymethyl anthracene | 75 | 3G8*[1] | 75 | 0.33 | −1.1 | 2.8 |
| | Protecting layer | PVB-2 | — | — | 3G8*[1] | 36 | 0.15 | | |
| Ex. 18 | Sound insulating layer | PVB-1 | Fluorene compound-2 | 75 | 3G8*[1] | 75 | 0.81 | −3.2 | 2.9 |

TABLE 4-continued

| | | $T_C$ (° C.) | E" ($T_C$) (Pa) | E" ($T_C$)/E" ($T_C$ [$3$][$0$ $10$]) | Sound transmission loss Temperature (° C.) | Average value [dB] | 5000 Hz [dB] | Solubility of compound having at least two ring structures and plasticizer | Transparency |
|---|---|---|---|---|---|---|---|---|---|
| Ex. 9 | Sound insulating layer Protecting layer | −15.6 | 2.43 × 10⁸ | 1.22 | 30 | 41 | 41.3 | Solved | A |
| Ex. 10 | Sound insulating layer Protecting layer | −18.4 | 2.65 × 10⁸ | 1.22 | 25 | 41.4 | 41.6 | Not Solved | C |
| Ex. 11 | Sound insulating layer Protecting layer | −18 | 2.56 × 10⁸ | 1.23 | 25 | 41.4 | 41.5 | Solved | A |
| Ex. 12 | Sound insulating layer Protecting layer | −20.1 | 2.56 × 10⁸ | 1.25 | 25 | 41.3 | 41.2 | Not Solved | C |
| Ex. 13 | Sound insulating layer Protecting layer | −18.5 | 2.56 × 10⁸ | 1.23 | 30 | 41.7 | 42 | Solved | A |
| Ex. 14 | Sound insulating layer Protecting layer | −17.8 | 2.32 × 10⁸ | 1.29 | 25 | 41.8 | 42.1 | Solved | A |
| Ex. 15 | Sound insulating layer Protecting layer | −4.5 | 2.90 × 10⁸ | 1.42 | 40 | 42.8 | 44 | Not Solved | C |
| Ex. 16 | Sound insulating layer Protecting layer | −16.7 | 2.89 × 10⁸ | 1.29 | 25 | 41.1 | 41.9 | Not Solved | B |
| Ex. 17 | Sound insulating layer Protecting layer | −22.6 | 2.17 × 10⁸ | 1.21 | 20 | 41.4 | 41.1 | Not Solved | C |
| Ex. 18 | Sound insulating layer | −25.6 | 2.24 × 10⁸ | 1.16 | 15 | 41.8 | 41.5 | Not Solved | C |

*¹3G8 (trietylene glycol di-2-ethylhexanoate)
*²content with respect to 100 parts by mass of resin

Comparative Example 1

An interlayer film for laminated glass and a laminated glass were produced by the same method as in Example 1, except that 9,9-bis[4-(2-acetoxyethoxy)phenyl]fluorene was not added, and the amount of triethylene glycol di(2-ethyl hexanoate) in the sound insulating layer was changed to 40 parts by mass. Regarding the obtained laminated glass, the sound transmission loss was measured by the aforementioned method. The measurement result thereof is shown in Table 5. In addition, a sheet having a thickness of 0.8 mm was obtained in the same manner as in Example 1, except that the same composition as that of the sound insulating layer of Comparative Example 1 was used. Regarding the obtained sheet, the temperature $T_A$, the tan δ ($T_A$), the temperature $T_C$, the loss modulus E" ($T_C$), and the loss modulus E" ($T_C$−10) were measured by the aforementioned methods to obtain the ratio of the loss modulus E" ($T_C$) to the loss modulus E" ($T_C$−10). The measurement results thereof are shown in Table 5.

Comparative Examples 2 to 10

Interlayer film for laminated glasses and laminated glasses were produced in the same manner as in Example 1, except that the sound insulating layer and the protecting layer were produced using the resin presented in Table 1 to have the composition and thickness presented in Table 5 and Table 6, and these sound insulating layer and protecting layer were used. Regarding the laminated glass obtained in each Comparative Example, the sound transmission loss was measured by the aforementioned method. The measurement result thereof is shown in Table 5 and Table 6. In addition, a sheet having a thickness of 0.8 mm was obtained in the same manner as in Example 1, except that the same composition as that of the sound insulating layer of each Comparative Example was used. Regarding the obtained sheet, the temperature $T_A$, the tan δ ($T_A$), the temperature $T_C$, the loss modulus E" ($T_C$), and the loss modulus E" ($T_C$−10) were measured by the aforementioned methods to obtain the ratio of the loss modulus E" ($T_C$) to the lose modulus E" ($T_C$−10). The measurement results thereof are shown in Table 5 and Table 6.

TABLE 5

|  |  | Resin | Compound (a2) | | Plasticizer (a3) | | Thickness (mm) | $T_A$ (°C) | tan δ ($T_A$) |
|---|---|---|---|---|---|---|---|---|---|
|  |  |  | Type | Content*2 (parts by mass) | Type | Content*2 (parts by mass) |  |  |  |
| Com. Ex. 1 | Sound insulating layer | Ethylene-vinyl acetate copolymer-1 | — | — | 3G8*1 | 40 | 0.15 | −5.6 | 1.3 |
|  | Protecting layer | PVB-2 | — | — | 3G8*1 | 36 | 0.33 |  |  |
| Com. Ex. 2 | Sound insulating layer | PVB-1 | — | — | 3G8*1 | 60 | 0.15 | −7.2 | 1.2 |
|  | Protecting layer | PVB-2 | — | — | 3G8*1 | 36 | 0.33 |  |  |
| Com. Ex. 3 | Sound insulating layer | PVB-1 | — | — | Dioctyl phthalate*3 | 60 | 0.15 | −5 | 1.2 |
|  | Protecting layer | PVB-2 | — | — | 3G8*1 | 36 | 0.33 |  |  |
| Com. Ex. 4 | Sound insulating layer | PVB-1 | — | — | Dinonyl cyclohexane dicarboxylic acid*3 | 60 | 0.15 | −5.1 | 1.1 |
|  | Protecting layer | PVB-2 | — | — | 3G8*1 | 36 | 0.33 |  |  |
| Com. Ex. 5 | Sound insulating layer | PVB-1 | — | — | Trioctyl phosphate*3 | 60 | 0.15 | −1.7 | 1.2 |
|  | Protecting layer | PVB-2 | — | — | 3G8*1 | 36 | 0.33 |  |  |
| Com. Ex. 6 | Sound insulating layer | PVB-1 | — | — | Polypropylene glycol*3 | 60 | 0.15 | −9.2 | 1.2 |
|  | Protecting layer | PVB-2 | — | — | 3G8*1 | 36 | 0.33 |  |  |
| Com. Ex. 7 | Sound insulating layer | PVB-1 | — | — | Castor oil*3 | 60 | 0.15 | 11 | 1.1 |
|  | Protecting layer | PVB-2 | — | — | 3G8*1 | 36 | 0.33 |  |  |
| Com. Ex. 8 | Sound insulating layer | PVB-1 | — | — | Polyester diol*3 | 60 | 0.15 | −3.3 | 1.2 |
|  | Protecting layer | PVB-2 | — | — | 3G8*1 | 36 | 0.33 |  |  |

|  |  | $T_C$ (°C) | E" ($T_C$) (Pa) | E" ($T_C$)/E" ($T_C$ [31 [0 10]) | Sound transmission loss | | | Solubility of compound having at least two ring structures and plasticizer | Transparency |
|---|---|---|---|---|---|---|---|---|---|
|  |  |  |  |  | Temperature (°C) | Average value [dB] | 5000 Hz [dB] |  |  |
| Com. Ex. 1 | Sound insulating layer Protecting layer | −42.2 | 1.11 × 10⁸ | 1.05 | 20 | 39.7 | 40.2 | — | — |
| Com. Ex. 2 | Sound insulating layer Protecting layer | −42.3 | 1.11 × 10⁸ | 1.05 | 20 | 39.5 | 40.1 | — | — |
| Com. Ex. 3 | Sound insulating layer Protecting layer | −45.8 | 1.08 × 10⁸ | 1.05 | 20 | 39.5 | 40.2 | — | — |
| Com. Ex. 4 | Sound insulating layer Protecting layer | −40.3 | 1.07 × 10⁸ | 1.04 | 20 | 39.4 | 40.3 | — | — |
| Com. Ex. 5 | Sound insulating layer Protecting layer | −32 | 1.06 × 10⁸ | 1.05 | 25 | 39.6 | 40.3 | — | — |
| Com. Ex. 6 | Sound insulating layer Protecting layer | −43.6 | 1.05 × 10⁸ | 1.04 | 15 | 39.6 | 40.1 | — | — |
| Com. Ex. 7 | Sound insulating layer Protecting layer | −29.3 | 1.07 × 10⁸ | 1.03 | 35 | 39.5 | 40 | — | — |
| Com. Ex. 8 | Sound insulating layer Protecting layer | −39.7 | 1.05 × 10⁸ | 1.03 | 20 | 39.6 | 39.9 | — | — |

*1 3G8 (triethylene glycol di-2-ethylhaxanoate)
*2 content with respect to 100 parts by mass of resin
*3 being not compound having at least two ring structures

TABLE 6

| | | Resin | Compound (a2) Type | Compound (a2) Content*2 (parts by mass) | Plasticizer (a3) Type | Plasticizer (a3) Content*2 (parts by mass) | Thickness (mm) | $T_A$ (° C.) | tan δ ($T_A$) |
|---|---|---|---|---|---|---|---|---|---|
| Com. Ex. 9 | Sound insulating layer | Ethylene-vinyl acetate copolymer-1 | — | — | 3G8*1 | 30 | 0.15 | −4.6 | 1.3 |
| | Protecting layer | PVB-2 | — | — | 3G8*1 | 36 | 0.33 | | |
| Com. Ex. 10 | Sound insulating layer | Polyvinyl acetate | — | — | 3G8*1 | 50 | 0.15 | −3.2 | 1.5 |
| | Protecting layer | PVB-2 | — | — | 3G8*1 | 36 | 0.33 | | |

| | | $T_C$ (° C.) | E" ($T_C$) (Pa) | E" ($T_C$)/E" ($T_C$ [31 [0 10]) | Sound transmission loss Temperature (° C.) | Sound transmission loss Average value [dB] | Sound transmission loss 5000 Hz [dB] | Solubility of compound having at least two ring structures and plasticizer | Transparency |
|---|---|---|---|---|---|---|---|---|---|
| Com. Ex. 9 | Sound insulating layer Protecting layer | −21.8 | $2.37 \times 10^8$ | 1.26 | 20 | 39.7 | 40.4 | — | — |
| Com. Ex. 10 | Sound insulating layer Protecting layer | −23.3 | $2.89 \times 10^8$ | 1.29 | 20 | 39.5 | 40.4 | — | — |

*1 3G8 (triethylene glycol di-2-ethylhaxanoate)
*2 content with respect to 100 parts by mass of resin

REFERENCE SIGNS LIST

1 LAYER A
2a LAYER B
2b LAYER B

The invention claimed is:

1. An interlayer film comprising a sound insulating layer which is formed from a composition (A) comprising:
at least one thermoplastic resin (a1); and
a compound (a2) having at least two ring structures and having a condensed ring skeleton;
wherein the thermoplastic resin (a1) is selected from the group consisting of a polyvinyl acetal, a polyvinyl carboxylate, and an olefin-vinyl carboxylate copolymer,
wherein a tan δ obtained when a dynamic viscoelasticity of a sheet, which is obtained by molding the composition (A) to have a thickness of 0.8 mm, is measured at a frequency of 0.3 Hz in a tension mode has a maximal value at a temperature $T_A$ (° C.),
$T_A$ (° C.) is in a range of −50 to 50° C., and
the tan δ at $T_A$ (° C.) is 2.5 or more.

2. The interlayer film according to claim 1, wherein a tan δ obtained when a dynamic viscoelasticity of a sheet, which is obtained by molding the resin (a1) to have a thickness of 0.8 mm, is measured at a frequency of 0.3 Hz in a tension mode has a maximal value at a temperature $T_B$ (° C.), and
$T_B$ (° C.) is in a range of −100 to 100° C.

3. The interlayer film according to claim 1, wherein a hydroxyl value of the resin (a1) is 300 mgKOH/g or less.

4. The interlayer film according to claim 1, wherein a hydroxyl value of the resin (a1) is 20 mgKOH/g to 1000 mgKOH/g.

5. The interlayer film according to claim 1, wherein the compound (a2) is a compound having at least one carbon atom bonded to four atoms which are all non-hydrogen atoms.

6. The interlayer film according to claim 5, wherein the compound (a2) is a compound having a skeleton in which at least two ring structures are directly bonded to the carbon atom bonded to four atoms which are all non-hydrogen atoms.

7. The interlayer film according to claim 1, wherein the compound (a2) is a compound having a fluorene skeleton.

8. The interlayer film according to claim 1, wherein a hydroxyl value of the compound (a2) is 500 mgKOH/g, or less.

9. The interlayer film according to claim 1, wherein a content of the compound (a2) is 5 to 1000 parts by mass with respect to 100 parts by mass of the resin (a1).

10. The interlayer film according to claim 1, wherein the composition (A) comprises X parts by mass of the compound (a2) and Y parts by mass of a plasticizer (a3) different from the compound (a2) with respect to 100 parts by mass of the resin (a1), and
in a case where X parts by mass of the compound (a2) and Y parts by mass of the plasticizer (a3) are stirred at 90° C. for 8 hours and then cooled to 23° C., the entire compound (a2) is dissolved in the plasticizer (a3).

11. The interlayer film according to claim 1, wherein a loss modulus E" obtained when a dynamic viscoelasticity of a sheet, which is obtained by molding the composition (A) to have a thickness of 0.8 mm, is measured at a frequency of 0.3 Hz in a tension mode has a maximal value at a temperature $T_C$ (° C.),
$T_C$ (° C.) is in a range of ($T_A$−40) to $T_A$ (° C.), and
the loss modulus E" at $T_C$ (° C.) is $2.5 \times 10^7$ to $2.5 \times 10^9$ Pa.

12. The interlayer film according to claim 1, wherein the sound insulating layer is disposed between two protecting layers, and
the protecting layer is formed from a composition (B).

13. The interlayer film according to claim 12, wherein a tan δ obtained when a dynamic viscoelasticity of a sheet, which is obtained by molding the composition (B) to have a thickness of 0.8 mm, is measured at a frequency of 0.3 Hz in a tension mode has a maximal value at a temperature $T_D$ (° C.), and $T_D-T_A>0$.

14. The interlayer film according to claim 12, wherein the composition (B) comprises at least one resin (b1) selected from the group consisting of a polyvinyl acetal, an ethylene-vinyl acetate copolymer, and an ionomer resin.

15. The interlayer film according to claim 14, wherein the composition (B) further comprises a plasticizer (b2), and
the resin (b1) is a polyvinyl acetal having an acetalization degree of 40 to 90 mol %.

16. A laminated glass obtained by sandwiching the interlayer film according to claim 1 between two glass plates.

\* \* \* \* \*